US009846788B2

(12) United States Patent
Oshida

(10) Patent No.: US 9,846,788 B2
(45) Date of Patent: Dec. 19, 2017

(54) SEMICONDUCTOR INTEGRATED CIRCUIT AND SYSTEM

(71) Applicant: RENESAS ELECTRONICS CORPORATION, Kawasaki-shi, Kanagawa (JP)

(72) Inventor: Daisuke Oshida, Kawasaki (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 638 days.

(21) Appl. No.: 14/315,486

(22) Filed: Jun. 26, 2014

(65) Prior Publication Data

US 2015/0006914 A1    Jan. 1, 2015

(30) Foreign Application Priority Data

Jun. 28, 2013 (JP) ................................ 2013-135754

(51) Int. Cl.
*G06F 11/30* (2006.01)
*G06F 21/72* (2013.01)
(Continued)

(52) U.S. Cl.
CPC ............. *G06F 21/72* (2013.01); *G06F 21/10* (2013.01); *G11B 20/00086* (2013.01)

(58) Field of Classification Search
CPC .. G06F 21/10; G11B 20/00086; G11B 20/021
See application file for complete search history.

(56) References Cited

U.S. PATENT DOCUMENTS

| 7,796,759 B2 | 9/2010 | Wuidart et al. |
| 7,856,103 B2 | 12/2010 | Kimura et al. |
| (Continued) | | |

FOREIGN PATENT DOCUMENTS

| JP | 2003-198528 A | 7/2003 |
| JP | 2007-184735 A | 7/2007 |
| (Continued) | | |

OTHER PUBLICATIONS

Japanese Office Action dated May 9, 2017 issued in Japanese Patent Application No. 2013-135754 (with English translation).

*Primary Examiner* — Ali Abyaneh
*Assistant Examiner* — Shaqueal Wade
(74) *Attorney, Agent, or Firm* — McDermott Will & Emery LLP

(57) ABSTRACT

To raise confidentiality of the value stored in the ROM, in an IC having a built-in or an externally-attached ROM storing a value (program and/or data) encrypted using a predetermined cryptographic key. The IC includes the ROM storing the encrypted value (program and/or data), a unique code generating unit, and a decrypting unit. The unique code generating unit generates a unique code specifically determined by production variation. The decrypting unit calculates a cryptographic key on the basis of the generated unique code and a correction parameter, and decrypts the encrypted value readout from the ROM by using the calculated cryptographic key. The correction parameter is preliminarily calculated outside the IC, on the basis of an initial unique code generated from the unique code generating unit immediately after production of the IC, and the predetermined cryptographic key used for encryption of the value to be stored in the ROM.

18 Claims, 14 Drawing Sheets

(51) Int. Cl.
G06F 21/10 (2013.01)
G11B 20/00 (2006.01)

(56) References Cited

U.S. PATENT DOCUMENTS

| | | | |
|---|---|---|---|
| 8,386,990 B1 | 2/2013 | Trimberger et al. | |
| 2005/0143853 A1* | 6/2005 | Akimori | G06Q 10/06 700/121 |
| 2006/0210082 A1* | 9/2006 | Devadas | G06F 21/31 380/277 |
| 2008/0295180 A1* | 11/2008 | Yoneda | G06F 21/33 726/27 |
| 2008/0320318 A1* | 12/2008 | Huang | G11B 20/00086 713/193 |
| 2010/0250936 A1* | 9/2010 | Kusakawa | H04L 9/3278 713/169 |
| 2012/0324310 A1 | 12/2012 | Oshida et al. | |
| 2014/0281587 A1* | 9/2014 | Ignatchenko | G06F 21/64 713/193 |

FOREIGN PATENT DOCUMENTS

| | | |
|---|---|---|
| JP | 2008-217579 A | 9/2008 |
| JP | 2013-3431 A | 1/2013 |
| JP | 2013-101442 A | 5/2013 |

* cited by examiner

*FIG. 11*

|     | CK(1)   | CK(2)   | ... |
| --- | ------- | ------- | --- |
| ICa | CD(1,a) | CD(2,a) | ... |
| ICb | CD(1,b) | CD(2,b) | ... |
| ... | ...     | ...     | ... |

|  | CK(1) | PK(1) | SK(1) | ... |
|---|---|---|---|---|
| ICa | CD(1,a) | PK(1) | CD(2,a) | ... |
| ICb | CD(1,b) | PK(1) | CD(2,b) | ... |
| ... | ... | ... | ... | ... |

9

SEMICONDUCTOR INTEGRATED CIRCUIT AND SYSTEM

CROSS-REFERENCE TO RELATED APPLICATION

The disclosure of Japanese Patent Application No. 2013-135754 filed on Jun. 28, 2013 including the specification, drawings and abstract is incorporated herein by reference in its entirety.

BACKGROUND

The present invention relates to a semiconductor integrated circuit having a CPU (Central Processing Unit) built therein and a non-volatile memory externally attached thereto or built therein, and to a system using the semiconductor integrated circuit, the invention being preferably applicable to a semiconductor integrated circuit which particularly encrypts and protects contents such as programs and data stored in a non-volatile memory, and to a system using the same.

With a semiconductor integrated circuit (IC) such as a microcomputer or a system LSI (Large Scale Integrated circuit) having a non-volatile memory such as a flash memory (registered trademark) and a CPU mounted in a single chip, programs and data are stored in a non-volatile memory and the CPU executes the programs and uses the data. The same applies to a case where the non-volatile memory storing the programs and data is externally attached. Readout of memory is mentioned as an attack to such a semiconductor device. Although the communication protocol is concealed by encryption, programs and data stored in a non-volatile memory of a semiconductor device cannot be protected from the aforementioned attack of directly reading the memory, by encryption of information to be communicated.

A technique of concealing the communication protocol by encryption is disclosed in, for example, Japanese Patent Laid-Open No. 2007-184735 and Japanese Patent Laid-Open No. 2013-003431, and a technique of protecting programs in a built-in memory of a microcontroller by encryption is disclosed in, for example, Japanese Patent Laid-Open No. 2008-217579.

Japanese Patent Laid-Open No. 2007-184735 discloses a system which performs authentication between the main body and an accessory thereof, the system having a microcontroller provided on each of the authenticating side and the authenticated side and performing authentication of whether or not the accessory is authentic by performing encryption on the same random number, on both sides, through the use of the same cryptographic key and by matching therebetween. A configuration so as to encrypt, on the basis of another cryptographic key and identification information, the cryptographic key for encrypting the random number makes it possible to prevent an imitation made by an illegally obtained program from operating normally, whereby imitations made by simply copying the program memory can be eliminated.

Japanese Patent Laid-Open No. 2013-003431 discloses a semiconductor device which is coupled to an external device and in which sufficient security is ensured when writing data. The semiconductor device includes a unique code generating unit capable of generating a value specific to the device (unique code), and transmits the unique code to an external device. A unique code is a value specific to individual devices by, for example, production variation, and is different for each individual even if the design information has been completely cloned. The unique code can be generated using, for example, a Physically Unclonable Function (PUF). Using the received unique code, the external device performs another encryption processing on the cryptographic key for use by the semiconductor device when writing data and then transmits it to the semiconductor device. The semiconductor device obtains a cryptographic key by decrypting the encrypted cryptographic key received using a unique code of its own. The semiconductor device encrypts the data to be concealed by using the cryptographic key, and writes the data. Since the cryptographic key for writing data is encrypted by unclonable unique data, highly secure communication becomes possible between the external device and the semiconductor device.

Japanese Patent Laid-Open No. 2008-217579 discloses a microcontroller including a memory which stores an encrypted program, a decrypting block which decrypts the program, and a CPU which executes the decrypted program. Decryption information for decrypting the encrypted program is held in a register in the decrypting block in a manner physically unreadable from the CPU.

Problems to be Solved by the Invention

As a result of examining Japanese Patent Laid-Open No. 2007-184735, Japanese Patent Laid-Open No. 2013-003431, and Japanese Patent Laid-Open No. 2008-217579 by the present inventors, the following new problem has been revealed.

In the case where programs or data to be concealed are stored in a non-volatile memory coupled to a CPU on-chip or via another chip, the premise is that the authenticating side is secure since the technique described in Japanese Patent Laid-Open No. 2007-184735 prevents copying the program to be concealed by performing authentication prior to execution of the program. According to the technique described in Japanese Patent Laid-Open No. 2013-003431, although the program to be concealed has been encrypted in the semiconductor device and the cryptographic key for decrypting is provided by an external device, and thus the semiconductor device itself need not hold the cryptographic key therein, but on the other hand, it is essential for the external device to be secure.

In contrast, the technique described in Japanese Patent Laid-Open No. 2008-217579 can be applied to a stand-alone microcontroller which cannot expect a secure communication counterpart. However, in order to do so, the devising of the hardware is required so that decryption information such as the cryptographic key for decrypting the encrypted program cannot be read even from the CPU. But, in an imitation product which copies the design information in its entirety, even such a creative ingenuity cannot conceal programs or data to be concealed in a sufficiently secure manner.

Means for solving the above problem are described in the following, and other problems and new feature will become clear from the description of the present specification and the accompanying drawings.

SUMMARY

According to an embodiment, the following is provided.

There is provided a semiconductor integrated circuit or a system including a non-volatile memory having stored therein a value (program and/or data) encrypted using a predetermined cryptographic key, a unique code generating unit, and a decrypting unit, which are configured as follows.

The unique code generating unit generates a unique code specifically determined by production variation. The decrypting unit calculates the cryptographic key on the basis of the generated unique code and a correction parameter, and decrypts the encrypted value read out from the non-volatile memory by using the calculated cryptographic key. The correction parameter is preliminarily calculated at the outside of the semiconductor integrated circuit or the system, on the basis of an initial unique code generated from the unique code generating unit after production of the semiconductor integrated circuit, and the predetermined cryptographic key used for encrypting the value to be stored in the non-volatile memory.

The following explains briefly the effect acquired by the typical invention among the inventions disclosed in the present application.

In other words, security of the semiconductor integrated circuit or the system can be enhanced. Even if a value (program code or data, etc.) encrypted and stored in a non-volatile memory mounted in the semiconductor integrated circuit or included in the system is read out by an attack that reads data stored in the memory, the cryptographic key is never known, whereby decryption of the encrypted code is not possible, and thus confidentiality is maintained. In addition, in an imitation made by copying the design of the semiconductor integrated circuit and the system in its entirety, the unique code generated from the unique code generating unit is different from the authentic product and thus the cryptographic key is not calculated correctly and decryption of the encrypted code is not possible, whereby confidentiality of the value encrypted and stored in the non-volatile memory is maintained.

BRIEF DESCRIPTION OF THE DRAWINGS

FIG. 11 is an explanatory diagram illustrating an exemplary configuration of a key database according to the fourth embodiment;

FIG. 16 is an explanatory diagram illustrating an exemplary configuration of a key database according to the eighth embodiment.

DETAILED DESCRIPTION

1. Outline of Embodiment

Figure 1:
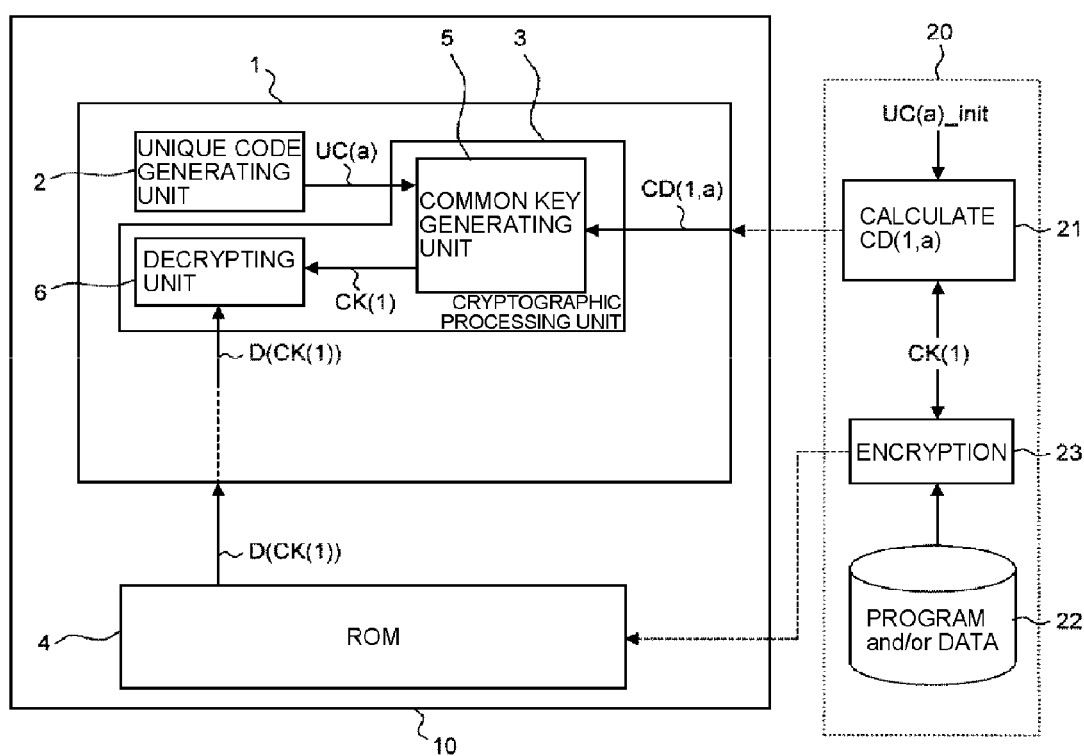
FIG. 1 is a block diagram illustrating a configuration of a ROM content protection system according to a first embodiment.

First, a representative embodiment disclosed in the present application will be outlined below. Reference numerals in the drawings which are referred to in parentheses in the outline description of the representative embodiment merely exemplify a component included in the concept of the component indicated by the reference numeral.

[1] <Decryption by Cryptographic Key Recovered from Unique Code and Correction Parameter>

A semiconductor integrated circuit (ICa, 1) according to a representative embodiment disclosed in the present application includes a non-volatile memory (ROM: Read Only Memory, 4) capable of storing a value (D(CK(1))) encrypted using a predetermined cryptographic key (CK(1)), a unique code generating unit (2), and a cryptographic processing unit (3), which are configured as follows.

The unique code generating unit is capable of generating a unique code (UC(a)) that is a multi-bit digital value specifically determined by production variation of the semiconductor integrated circuit.

The cryptographic processing unit is configured so as to be capable of calculating the cryptographic key (CK(1)) on the basis of a correction parameter (CD(1, a)) and the unique code, and decrypting the encrypted value (D(CK(1))) read out from the non-volatile memory through the use of the calculated cryptographic key.

The correction parameter is preliminarily calculated at the outside (20) of the semiconductor integrated circuit, on the basis of an initial unique code (UC(a) init) and the predetermined cryptographic key (CK(1)), generated from the unique code generating unit after production of the semiconductor integrated circuit.

Accordingly, security of the semiconductor integrated circuit (ICa, 1) can be enhanced. Even if a value (program code or data) (D(CK(1))) encrypted and stored in a non-volatile memory (ROM,4) mounted in the semiconductor integrated circuit is read out by an attack of reading out the data stored in the memory, the cryptographic key (CK(1)) is never known, whereby decryption of the encrypted code is prevented and thus confidentiality is maintained. In addition, in an imitation made by copying the design of the semiconductor integrated circuit (ICa, 1) in its entirety, the unique code (UC(x)) generated from the unique code generating unit (2_x) is different from the unique code (UC(a)) of the authentic product, and thus the cryptographic key cannot be calculated correctly. Accordingly, it is not possible to decrypt the encrypted code of the value (program code or data) (D(CK(1))) encrypted and stored in a non-volatile memory (ROM,4), whereby confidentiality is maintained. Furthermore, even if the correction parameter (CD(1, a)) is read along the communication path from the outside (20) to the semiconductor integrated circuit (ICa, 1) and revealed to the attacker, confidentiality of the value (ROM content such as a program code or data) (D(CK(1))) encrypted and stored in the non-volatile memory (ROM,4) is similarly maintained. This is because the cryptographic key (CK(1)) is not calculated correctly unless the unique code (UC(a)) of the authentic product is generated.

[2] <Unique Code Including Error>

In item 1, the cryptographic processing unit is configured to be capable of calculating the cryptographic key (CK(1)) on the basis of the correction parameter (CD(1, a)) and the unique code (UC(a)), even if the unique code (UC(a)) generated from the unique code generating unit includes an error relative to the initial unique code (UC(a)_init).

Accordingly, even if the unique code (UC(a)) generated from the unique code generating unit includes an error relative to the initial unique code (UC(a)_init), the cryptographic processing unit (3) is capable of correcting the error and calculating the correct cryptographic key (CK(1)), whereby the semiconductor integrated circuit (ICa, 1) can maintain its normal functionality.

[3] <Holding of Correction Parameter in the Same Chip>

In item 1 or 2, the correction parameter (CD(1, a)) is held in the same chip.

Accordingly, data communication for transmitting the correction parameter can be made unnecessary.

[4] <Obtaining of Correction Parameter Via Network>

In item 1 or 2, the semiconductor integrated circuit further includes a network interface (12), and the correction parameter (CD(1, a)) is configured to be capable of being received via the network interface.

Accordingly, information (CD(1, a)) corresponding to the cryptographic key can also be delivered via a network (11), in a state of ensured security.

[5] <Generation of a Plurality of Cryptographic Keys from a Single Unique Code>

In item 1 or 2, the correction parameter is defined as a first correction parameter (CD(1, a)) and the cryptographic key is defined as a first cryptographic key (CK(1)), and the cryptographic processing unit is configured to be capable of calculating a second cryptographic key (CK(2)) different from the first cryptographic key, on the basis of a second correction parameter (CD(2, a)) different from the first correction parameter and the unique code.

Accordingly, a plurality of cryptographic keys can be properly used for each intended use, whereby security of the semiconductor integrated circuit can be further improved.

[6] <CPU (Central Processing Unit)>

In any one of items 1 to 5, the semiconductor integrated circuit further includes a CPU (13), the non-volatile memory (4) is configured to be capable of storing a value obtained by encrypting a program code of a program executable on the CPU by using the predetermined cryptographic key, and the CPU is configured to be capable of executing the program decrypted by the cryptographic processing unit.

Accordingly, the program stored in the non-volatile memory is concealed.

[7] <Readout of Encrypted Data from CPU>

In item 6, the non-volatile memory (4) is configured to be capable of storing a value obtained by encrypting data accessible from the CPU (13) by using the predetermined cryptographic key, and the CPU is configured to be capable of reading the data decrypted by the cryptographic processing unit.

Accordingly, the CPU is allowed to use the data stored and concealed in the non-volatile memory.

[8] <Writing of Data from CPU to Non-Volatile Memory>

In item 6, the cryptographic processing unit further includes a function of encrypting data output from the CPU by using the calculated cryptographic key, and the CPU is configured to be capable of writing data into the non-volatile memory, after the data to be written into the non-volatile memory has been encrypted by the cryptographic processing unit.

Accordingly, even if there is data to be added to the non-volatile memory or changed while the semiconductor integrated circuit is being used, the data can be concealed.

[9] <ROM Content Protection System>

A system (ROM content protection system 10) according to a representative embodiment disclosed in the present application includes a semiconductor integrated circuit (ICa, 1) including the unique code generating unit (2) and the cryptographic processing unit (3), and the non-volatile memory (ROM, 4) capable of storing the value (D(CK(1))) encrypted using the predetermined cryptographic key (CK (1)), which are configured as follows.

The unique code generating unit is capable of generating the unique code (UC(a)), which is a multi-bit digital value specifically determined by production variation of the semiconductor integrated circuit.

The cryptographic processing unit is configured to be capable of calculating the cryptographic key (CK(1)) on the basis of the correction parameter (CD(1, a)) and the unique code, and decrypting the encrypted value (D(CK(1))) readout from the non-volatile memory by using the calculated cryptographic key.

The correction parameter is preliminarily calculated at the outside (20) of the semiconductor integrated circuit, on the basis of the initial unique code (UC(a)_init) generated from the unique code generating unit after production of the semiconductor integrated circuit, and the predetermined cryptographic key (CK(1)).

Accordingly, security of the system (ROM content protection system 10) configured to include the semiconductor integrated circuit (ICa, 1) can be enhanced. Even if a value (ROM content such as a program code or data) (D(CK(1))) encrypted and stored in the non-volatile memory (4) built in or externally attached to the semiconductor integrated circuit (ICa, 1) is read out by an attack of reading out the data stored in the memory, the cryptographic key (CK(1)) will never be known, whereby decryption of the encrypted code is prevented and thus confidentiality is maintained. In addition, in an imitation product made by copying the design of the semiconductor integrated circuit (ICa, 1) in its entirety, the unique code (UC(x)) generated from the unique code generating unit (2_x) is different from the authentic product, and thus the cryptographic key (CK(1)) cannot be calculated correctly and the encrypted code cannot be decrypted, whereby confidentiality of the value encrypted and stored in the non-volatile memory (4) is maintained.

[10] <Unique Code Including Error>

In item 9, the cryptographic processing unit is configured to be capable of calculating the cryptographic key (CK(1)) on the basis of the correction parameter (CD(1, a)) and the unique code, even if the unique code (UC(a)) generated from the unique code generating unit includes an error relative to the initial unique code (UC(a)_init).

Accordingly, even if the unique code (UC(a)) generated from the unique code generating unit (2) includes an error, the cryptographic processing unit is capable of correcting the error and calculating the correct cryptographic key (CK(1)), whereby the semiconductor integrated circuit (ICa, 1) can maintain its normal functionality in the ROM content protection system (10). Furthermore, security of the entire ROM content protection system (10) including the semiconductor integrated circuit (ICa, 1) can also be enhanced.

[11] <Key Database>

In item 9 or 10, there is further provided a database (9) which holds the correction parameter (CD(1, a)) in association with the semiconductor integrated circuit, and supplies the correction parameter to the semiconductor integrated circuit.

Accordingly, the non-volatile memory (4) storing the encrypted value (D(CK(1))) and the correction parameter (CD(1, a)) for generating the cryptographic key are managed by separate chips, whereby security can be enhanced.

[12] <A Plurality of Semiconductor Integrated Circuits and a Key Database>

In item 9 or 10, the system is configured to include a plurality of the semiconductor integrated circuits and the database (9).

Each of the semiconductor integrated circuits (1_a, 1_b) is configured to include the non-volatile memory (4_a, 4_b), the unique code generating unit, and the cryptographic processing unit.

The non-volatile memory has stored therein values (D(CK(1, a)), D(CK(1, b))) encrypted using cryptographic keys (1, CK(a), 1, CK(b)) corresponding to each of the semiconductor integrated circuits.

The database holds a plurality of the correction parameters in association with each of the semiconductor integrated circuits, and supplies the correction parameters to corresponding semiconductor integrated circuits.

The correction parameter (CD(1, a)) is preliminarily calculated at the outside of the system and stored in the database (9), on the basis of the initial unique code (UC(a)_init) generated from the unique code generating unit after production of the corresponding semiconductor integrated circuit, and the cryptographic key used for encryption of the value to be stored in the non-volatile memory of the corresponding semiconductor integrated circuit.

Instead of being built in each of the semiconductor integrated circuits (1_a, 1_b), the non-volatile memory (4_a, 4_b) may be externally attached thereto. In such a case, each of the semiconductor integrated circuits (1_a, 1_b) is configured to include a volatile memory (14) so that the encrypted value (D(CK(1, a)), D(CK(1, b))) stored in the non-volatile memory (4_a, 4_b) can be transferred thereto from the non-volatile memory (4_a, 4_b).

Accordingly, there can be constructed the ROM content protection system (10) having more than one semiconductor integrated circuits (1_a, 1_b) mounted thereon, with an enhanced security. The system may be configured to have mounted thereon a plurality of semiconductor integrated circuits of the same type, or may be configured to include different types of semiconductor integrated circuits, or further, may be configured to include the semiconductor integrated circuits of the same type and different types of semiconductor integrated circuits.

[13] <Externally Attached ROM+RAM-Based LSI>

In item 9 or 10, the semiconductor integrated circuit further includes a volatile memory (RAM, 14) and the value (D(CK(1))) encrypted using the predetermined cryptographic key is configured to be capable of being transferred from the non-volatile memory to the volatile memory. In addition, the cryptographic processing unit is configured to be capable of decrypting the encrypted value read out from the volatile memory.

Accordingly, even if the semiconductor integrated circuit (ICa, 1) is a so-called RAM-based circuit without a non-volatile memory built therein, confidentiality of the encrypted and stored value (ROM content) which has been transferred from the non-volatile memory (4) to the built-in volatile memory (RAM, 14) of the semiconductor integrated circuit (ICa, 1) can be maintained.

[14] <Database of Externally Attached ROM+RAM-Based LSI>

In item 13, there is further provided a controlled semiconductor integrated circuit (ICs, 8) configured to include a database (9) which holds the correction parameter (CD(1, a)) in association with the semiconductor integrated circuit and supplies the correction parameter to the semiconductor integrated circuit, and the non-volatile memory (4).

Accordingly, increase of the number of parts included in the ROM content protection system (10) can be suppressed in the case where the semiconductor integrated circuit (ICa, 1) is a so-called RAM-based circuit without a non-volatile memory built therein.

[15] <Obtaining of Correction Parameter Via Network>

In item 11 or 12, the semiconductor integrated circuit and the database are coupled via the network (11), and the correction parameter (CD(1, a)) is configured to be capable of being received by the semiconductor integrated circuit via the network.

Accordingly, information (CD(1, a)) corresponding to the cryptographic key can be delivered even through the network (11), in a state of ensured security.

[16] <Generation of a Plurality of Cryptographic Keys from a Single Unique Code>

In item 11 or 12, the cryptographic key used for encryption of the value to be stored in the non-volatile memory is defined as a first cryptographic key (CK(1)), and the database holds a plurality of the correction parameters (CD(1, a), CD(2, a)) in association with the semiconductor integrated circuit and supplies the correction parameters to the semiconductor integrated circuit.

The cryptographic processing unit is configured to be capable of calculating the first cryptographic key (CK(1)) and another cryptographic key (CK(2)), on the basis of the supplied correction parameters and the unique code, and decrypting the encrypted value read out from the non-volatile memory by using the calculated first cryptographic key (CK(1)).

Accordingly, the cryptographic keys (CK(1), CK(2)) can be properly used for each intended use, whereby security of the semiconductor integrated circuit can be further enhanced and security of the entire ROM content protection system (10) can also be enhanced.

[17] <Generation of Cryptographic Keys for Authentication and Decryption from a Single Unique Code>

In item 11 or 12, the cryptographic key used for encryption of the value to be stored in the non-volatile memory is defined as a first cryptographic key (CK(1)) and the correction parameter corresponding to the first cryptographic key is defined as a first correction parameter (CD(1, a)), and the system includes a management integrated circuit (8) including the database and an authentication unit (18).

The management integrated circuit holds, in the database, the first correction parameter and the second correction parameter (CD(2, a)) associated with the semiconductor integrated circuit. The management integrated circuit further holds, in the authentication unit, challenge data (Chr) and a challenge data expected value (Exp) obtained by encrypting the challenge data using the second cryptographic key (CK(2)) corresponding to the second correction parameter, and supplies the second correction parameter and the challenge data to the semiconductor integrated circuit.

In the semiconductor integrated circuit, the cryptographic processing unit generates the second cryptographic key (CK(2)), on the basis of the supplied second correction parameter and the unique code, encrypts the supplied challenge data using the second cryptographic key, and returns the encrypted challenge data (Chr(CK(2))) to the management integrated circuit.

The management integrated circuit compares the encrypted and returned challenge data (Chr(CK(2))) with the challenge data expected value (Exp) held in the authentication unit, and in the case of a match, supplies the first correction parameter (CD(1, a)) to the semiconductor integrated circuit.

The semiconductor integrated circuit calculates the first cryptographic key (CK(1)), on the basis of the supplied first correction parameter (CD(1, a)) and the unique code (UC (a)), and decrypts the encrypted value (D(CK(1))) read out from the non-volatile memory by using the calculated first cryptographic key.

Accordingly, one of the cryptographic keys, CK(2), can be used for authentication, whereby security of the semiconductor integrated circuit can be further enhanced and security of the entire ROM content protection system (10) can also be enhanced.

[18] <Generation of Cryptographic Keys for Authentication and Decryption from a Single Unique Code (Holding of Correction Parameter in the Same Chip)>

In item 11 or 12, the cryptographic key used for encryption of the value to be stored in the non-volatile memory is defined as a first cryptographic key (CK(1)) and the correction parameter corresponding to the first cryptographic key is defined as a first correction parameter (CD(1, a)), and the system includes the management integrated circuit (8) including the database and the authentication unit (18).

The management integrated circuit holds, in the database, the first correction parameter (CD(1, a)) and the second correction parameter (CD(2, a)) associated with the semiconductor integrated circuit. The management integrated circuit further holds, in the authentication unit, challenge data (Chr) and the challenge data expected value (Exp) obtained by encrypting the challenge data by using the second cryptographic key (CK(2)) corresponding to the second correction parameter, and supplies the challenge data to the semiconductor integrated circuit.

The semiconductor integrated circuit holds the second correction parameter (CD(2, a)), and the cryptographic processing unit generates the second cryptographic key (CK(2)) on the basis of the second correction parameter and the unique code, encrypts the supplied challenge data by using the second cryptographic key, and returns the encrypted challenge data (Chr(CK(2))) to the management integrated circuit.

The management integrated circuit compares the encrypted and returned challenge data (Chr(CK(2))) with the challenge data expected value (Exp) held in the authentication unit, and in the case of a match, supplies the first correction parameter (CD(1, a)) to the semiconductor integrated circuit.

The semiconductor integrated circuit calculates the first cryptographic key (CK(1)), on the basis of the supplied first correction parameter (CD(1, a)) and the unique code (UC (a)), and decrypts the encrypted value (D(CK(1))) read out from the non-volatile memory by using the calculated first cryptographic key.

Accordingly, one of the cryptographic keys can be used for authentication, whereby security of the semiconductor integrated circuit can be further enhanced and security of the entire ROM content protection system (10) can also be enhanced.

[19] <Generation of Cryptographic Keys for Authentication and Decryption from a Single Unique Code (Public Key Authentication Method)>

In item 11 or 12, the cryptographic key used for encryption of the value to be stored in the non-volatile memory is defined as a first cryptographic key (CK(1)) and the correction parameter corresponding to the first cryptographic key is defined as a first correction parameter (CD(1, a)), and the system includes the management integrated circuit (8) including the database and the authentication unit (18).

The management integrated circuit holds, in the database, the first correction parameter, the second correction parameter (CD(2, a)), the challenge data (Chr), and a public key (PK(1)), associated with the semiconductor integrated circuit, and supplies the second correction parameter and the challenge data to the semiconductor integrated circuit.

In the semiconductor integrated circuit, the cryptographic processing unit generates the second cryptographic key (CK(2)) on the basis of the second correction parameter and the unique code, encrypts the supplied challenge data using the second cryptographic key, and returns the encrypted challenge data to the management integrated circuit.

The management integrated circuit decrypts the encrypted and returned challenge data (Chr(CK(2)) by using the public key, compares the decrypted value with the challenge data, and in the case of a match, supplies the first correction parameter to the management integrated circuit.

The semiconductor integrated circuit calculates the first cryptographic key, on the basis of the supplied first correction parameter and the unique code, and decrypts the encrypted value read out from the non-volatile memory by using the calculated first cryptographic key.

Accordingly, one of the cryptographic keys, CK(2), can be used for authentication, whereby security of the semiconductor integrated circuit can be further enhanced and security of the entire ROM content protection system (10) can also be enhanced.

[20] <Reproduction of Secret Key in Semiconductor Integrated Circuit (ICa, 1)>

In item> 19, the second cryptographic key is a secret key (SK(1)) of the semiconductor integrated circuit corresponding to the public key.

Accordingly, the second cryptographic key can be applied to the public key authentication system.

2. Details of Embodiments

Embodiments will be described in more detail.

[First Embodiment]<IC that Generates Cryptographic Key from Correction Parameter and Unique Code>

A ROM content protection system according to a representative embodiment disclosed in the present application will be described. Description of the first embodiment is commonly valid to the following other embodiments.

FIG. 1 is a block diagram illustrating a configuration of a ROM content protection system 10 according to the first embodiment. The ROM content protection system 10 includes the semiconductor integrated circuit (ICa, 1) configured to include a unique code generating unit 2 and a cryptographic processing unit 3, and a non-volatile memory (ROM) 4. The ROM 4 may be an electrically rewritable non-volatile memory such as a flash memory (registered trademark), or a non-rewritable memory such as a mask ROM. The ROM 4 has stored therein a program and/or data encrypted using a predetermined cryptographic key CK(1). Regardless of being a program or data, the content is referred to as an encrypted value D(CK(1)). The cryptographic key CK(1) is, for example, a common key and the program and/or data, which is content 22 to be concealed when stored in the ROM 4, is encrypted through an encryption processing step 23 using a common key CK(1) in an off-line processing 20 and written into the ROM 4.

The unique code generating unit 2 is capable of generating a unique code UC(a) which is a multi-bit digital value specifically determined by production variation of ICa1. The unique code generating unit 2 is capable of generating the unique code UC(a) using a physically unclonable function (PUF), although not particularly limited thereto. In an SRAM (Static Random Access Memory), for example, a state of the memory cell when powered on is a digital value specifically determined by production variation for each of individual products even if the design parameters or production parameters are completely the same, the digital value being available as the unique code UC(a). The value is referred to as SRAM-PUF. In addition, there are those using signal propagation delay of the logic gate circuit, or those using an analog element value. Any type of PUF may be used for the unique code generating unit 2.

The cryptographic processing unit 3 is configured to include, for example, a common key generating unit 5 and a decrypting unit 6. The common key generating unit 5 and the decrypting unit 6 need not be configured as separate hardware blocks, but may be realized by a common key generation step and a decrypting step in a series of software processing, or may be realized as processing performed by cooperative operation of hardware and software. The cryptography processing unit 3 calculates the common key CK(1) on the basis of the unique code UC(a) and a correction parameter CD(1, a) described below, and the encrypted value D(CK(1)) read out from the ROM 4 can be decrypted using the calculated common key CK(1).

The correction parameter CD(1, a) is preliminarily calculated at a correction parameter calculation step 21 of an external off-line processing 20, on the basis of the initial unique code UC(a)_init generated from the unique code generating unit 2 immediately after production of an ICa1 and the common key CK(1). The common key CK(1) has the same value as the common key CK(1) used at an encryption step 23 for encrypting the content 22 to be concealed when stored in the ROM 4. It suffices that the algorithm of the correction parameter calculation step 21 and the algorithm of the common key generating unit 5 are an algorithm capable of uniquely determining the common key CK(1) by referring to the correction parameter CD(1, a) and the unique code UC(a). Here, the off-line processing 20 is processing performed in a secure device which require coupling with ICa as a premise, in which the cryptographic key CK(1), the content of the encryption step 23 and the correction parameter calculation step 21, the input and output data, the intermediate data, or the like are concealed safely.

The ROM 4 may be built in or externally attached to the semiconductor integrated circuit (ICa) 1.

Figure 2:
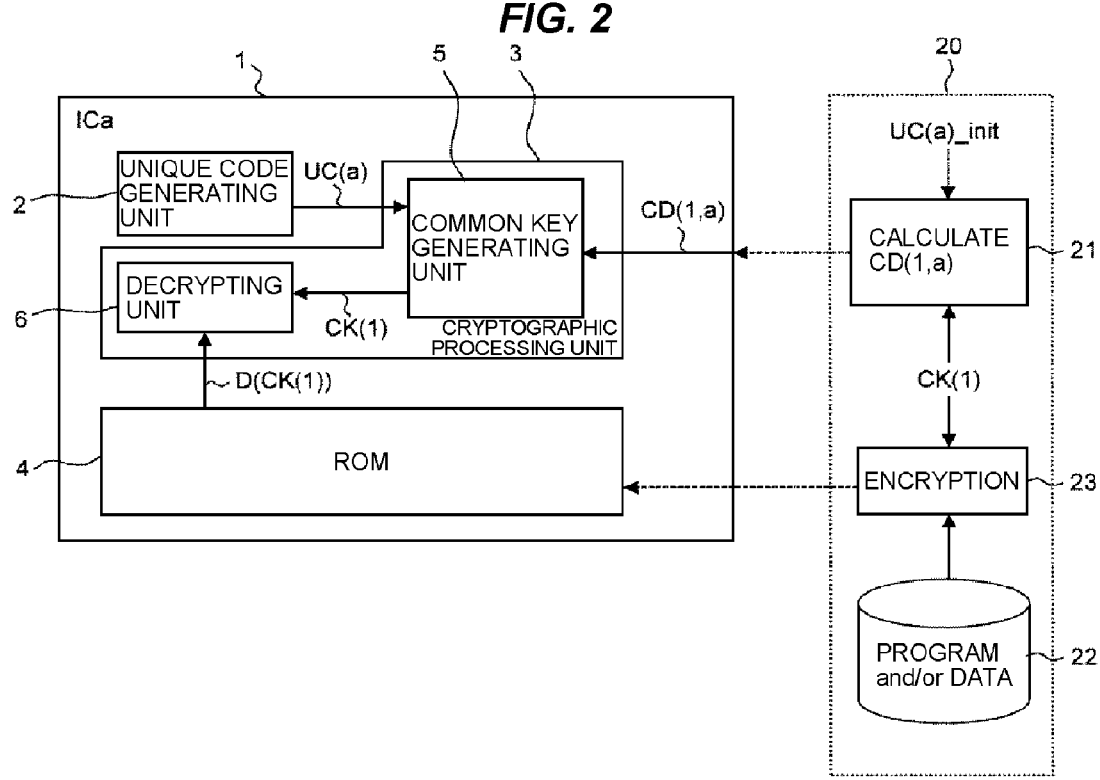
FIG. 2 is a block diagram illustrating the ROM content protection system according to the first embodiment, configured to include a semiconductor integrated circuit (ICa) having a ROM built therein.

FIG. 2 is a block diagram illustrating the ROM content protection system 10 according to the first embodiment, configured to include the semiconductor integrated circuit (ICa) 1 having the ROM 4 built therein. In the case of the built-in ROM 4, a value (ROM content such as a program code or data) D(CK(1)) read out from the ROM 4 is supplied to the decrypting unit 6 directly or through a transfer circuit such as a bus bridge, for example, and decrypted therein. Since the configuration of other parts in FIG. 2 is similar to FIG. 1, explanation thereof is omitted.

Figure 3:
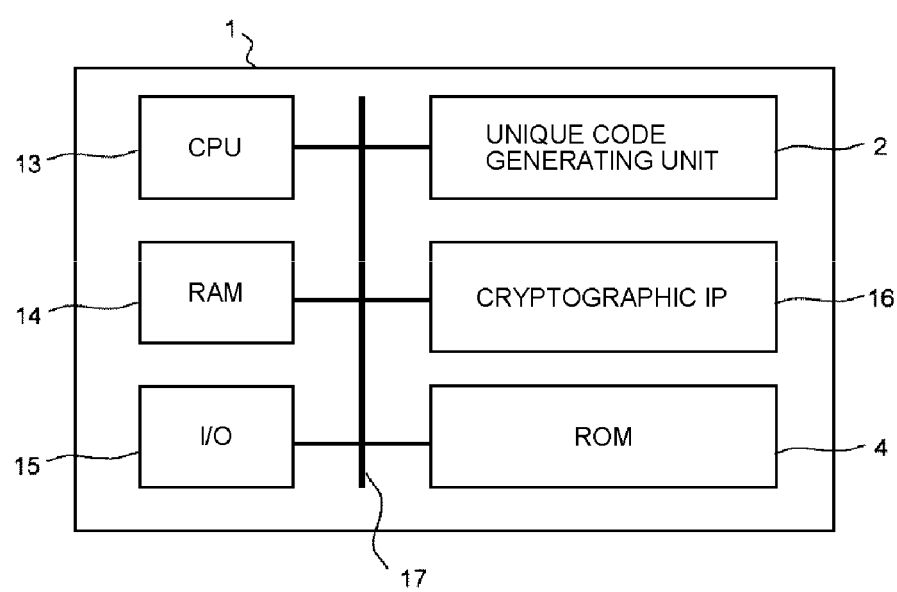
FIG. 3 is a block diagram illustrating an exemplary configuration of the semiconductor integrated circuit according to the embodiment (microcontroller having a ROM built therein)

FIG. 3 is a block diagram illustrating an exemplary configuration of the semiconductor integrated circuit (ICa) 1 according to the embodiment (microcontroller having a ROM built therein). This is an example implemented as a microcontroller including a CPU 13. Details will be described below. There is built-in a non-volatile memory having stored therein a program executed by the CPU 13 and data used by the program. ARAM 14 is a volatile memory which temporarily holds intermediate data of the program.

Figure 4:
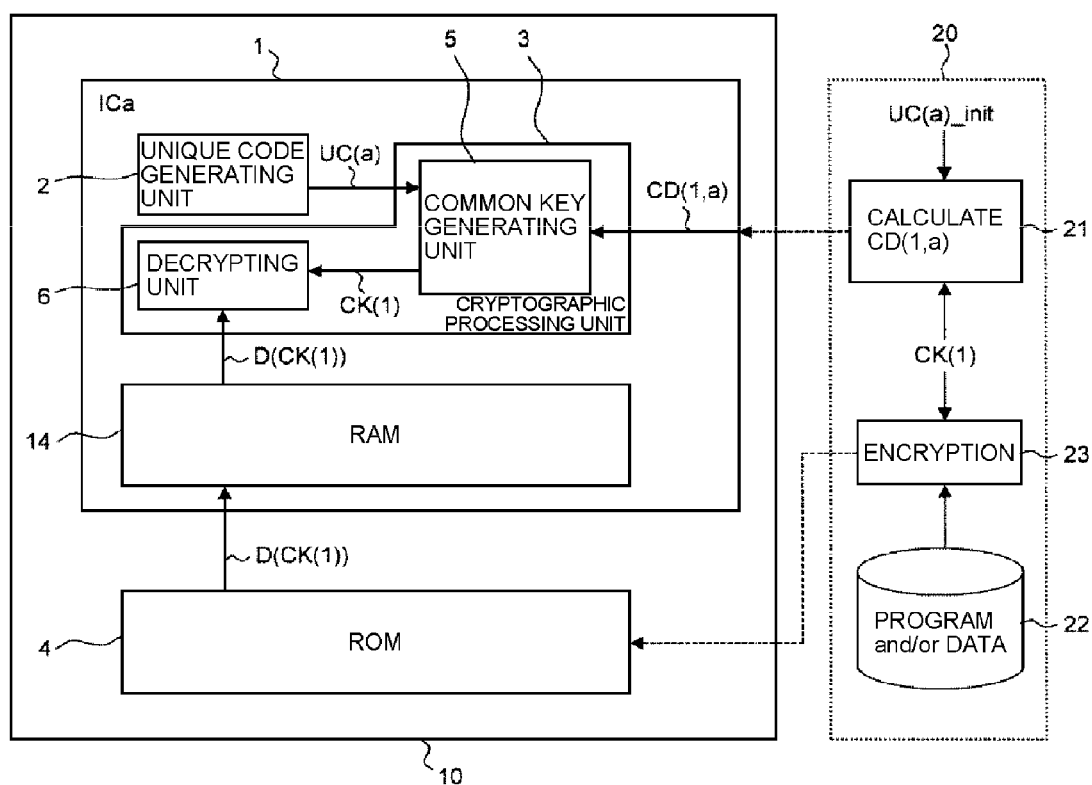
FIG. 4 is a block diagram illustrating the ROM content protection system according to the first embodiment configured to include a semiconductor integrated circuit (ICa) with an externally-attached ROM.

FIG. 4 is a block diagram illustrating the ROM content protection system according to the first embodiment configured to include the semiconductor integrated circuit (ICa) with a ROM externally attached thereto. In the case where the ROM 4 is externally attached, the value (ROM content such as a program code or data) D(CK(1)) read out from the ROM 4 is temporarily transferred to the RAM 14 built in the semiconductor integrated circuit (ICa) 1. The transfer is executed by, for example, a boot-up sequence when powered on. Subsequently, when the RAM 14 is accessed, the value (ROM content such as a program code or data) D(CK(1)) read out from the RAM 14 is supplied to the decrypting unit 6 and decrypted therein. Since the configuration of other parts in FIG. 4 is similar to FIG. 1, explanation thereof is omitted.

Figure 5:
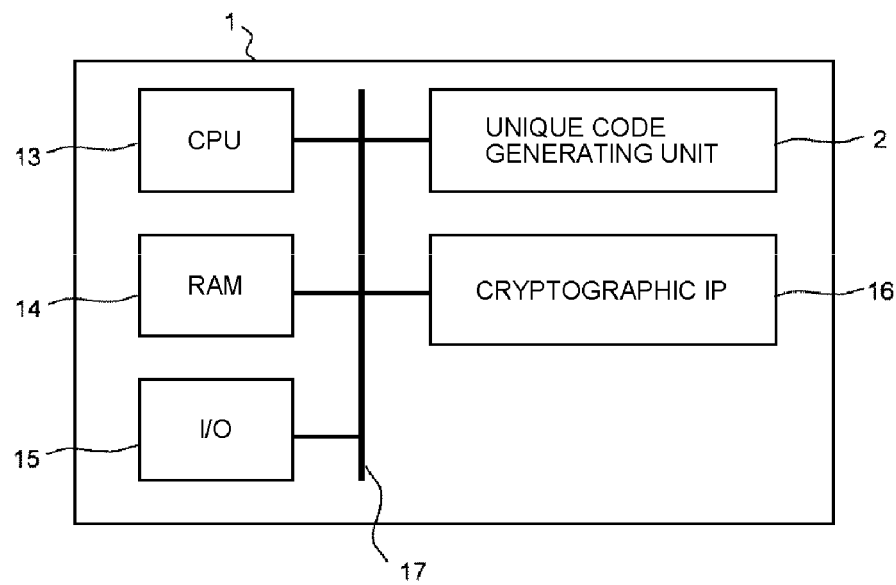
FIG. 5 is a block diagram illustrating an exemplary configuration of the semiconductor integrated circuit (RAM-based microcontroller) according to the embodiment.

At this time, a so-called RAM-based microcontroller without a built-in-on-chip ROM 4 can be used as the semiconductor integrated circuit (ICa). FIG. 5 is a block diagram illustrating an exemplary configuration of the semiconductor integrated circuit according to the embodiment (RAM-based microcontroller). Although details will be described below, difference from the microcontroller illustrated in FIG. 3 lies in the fact that the ROM 4 is not built in on chip. A program or the like is executed after having been read out from the externally attached ROM 4 in a boot-up sequences or the like when powered on and having transferred to the on-chip RAM 14.

As has been described above, security of the semiconductor integrated circuit (ICa) 1 can be enhanced. Even if a value (program code or data) D(CK(1)) encrypted and stored in the ROM 4 built in or externally attached to ICa1 is read out by an attack of reading out the data stored in the memory, the common key CK(1) is never known, whereby decryption of the encrypted code is prevented and thus confidentiality is maintained. In addition, even in an imitation product made by copying the design in its entirety, confidentiality of the value encrypted and stored in the non-volatile memory is maintained. In an imitation IC product made by copying the design of ICa1 in its entirety, the unique code UC(x) generated from the unique code generating unit 2_x of the imitation IC is different from the unique code UC(a) of the authentic product. This is because since the unique code UC is a multi-bit digital value specifically determined by production variation, generated unique codes are not the same due to difference of production variation even if the imitation IC has the same design as the authentic IC. This is the manifestation of the "physically unclonable" nature of PUF. The imitation IC has the value D(CK(1)) encrypted using the authentic common key CK(1) stored in the ROM 4, as with the clone source IC. The unique code UC(x) generated from the unique code generating unit 2_x is different from the authentic product. Accordingly, the common key generated from the common key generating unit 5_x is also different from the authentic common key CK(1) and thus it is not possible to decrypt D(CK(1)). As described above, security of the semiconductor integrated circuit (ICa) 1 can be enhanced.

<When Unique Code Includes an Error>

The principle of enhancing security of ICa in the first embodiment makes use of the fact that the encryption common key CK(1) is not read out from the outside, and that the use of the unique code UC(a) for generation of the common key CK(1) prevents the same value from being generated in the cloned IC. On the other hand, it is necessary that the same common key CK(1) as the common key CK(1) used for offline encryption is generated in order that the value D(CK(1)) to be concealed may be correctly decrypted.

However, there are cases where the unique code UC(a) generated from the unique code generating unit 2 varies due to changes of power source voltage and temperature, or secular change of ICa1. This is because PUF utilizes a physical parameter and thus depends on its operational environment, when the unique code generating unit 2 uses PUF. Accordingly, the unique code UC(a) generated from the unique code generating unit 2 is not always completely identical to the initial unique code UC(a)_init immediately after production and may include an error relative to the initial unique code UC(a)_init.

Therefore, it suffices that the cryptographic processing unit 3 is configured to be capable of calculating the common key CK(1) on the basis of the correction parameter CD(1, a) and the unique code UC(a), even if the unique code UC(a) generated from the unique code generating unit 2 includes an error relative to the initial unique code UC(a)_init.

Accordingly, even if the unique code UC(a) generated from the unique code generating unit 2 includes an error relative to the initial unique code UC(a)_init, the cryptographic processing unit 3 is capable of correcting the error and calculating the correct common key CK(1), whereby the semiconductor integrated circuit (ICa) 1 can maintain its normal functionality.

It suffices that the algorithm of the correction parameter calculation step 21 and the algorithm of the common key generating unit 5 are an algorithm capable of uniquely determining the common key CK(1), by referring to the correction parameter CD(1, a) and the unique code UC(a). Here, in order to the generate same the common key CK(1) even if the unique code UC(a) includes an error relative to the initial unique code UC(a)_init, an error correcting code can be used, for example, although not particularly limited thereto. Here, the error correcting code is, for example, a hamming code or a BCH code, and can configure an (n+m)-bit code obtained by combining n-bit data and m-bit redundancy bits so that an error of k bits or less can be corrected. When the n-bit data is set to be the unique code UC(a) and the m-bit redundancy bits are set to be the correction parameter CD(1, a), an error of k bits or less included in the (n+m)-bit code obtained by combining the both can be corrected. The error-corrected n bits can be set to be the common key CK(1), or the entire (n+m)-bit code a can be set to be the common key CK(1), or data of a suitable number of bits may be generated from the (n+m)-bit code on the basis of a certain rule and be set to be the common key CK(1).

The number of bits k corresponding to the error correction ability can be adjusted using the number of bits n of the original data and the number of bits m of the redundancy bits to be combined, on the basis of the correction algorithm of the error correcting code employed. It suffices that the number of bits k may be determined in accordance with the actual number of bits of the error included in the unique code UC(a). Respective numbers of bits of the unique code UC(a) and the correction parameter CD(1, a) need not be associated with the number of bits n of the data of the error correcting code and the number of bits m of the redundancy bits.

<Form of Implementing Semiconductor Integrated Circuit (ICa) 1>

The semiconductor integrated circuit (ICa) 1 can be realized, for example, as a microcontroller further including a CPU.

FIGS. 3 and 5 are block diagrams illustrating an exemplary configuration of the semiconductor integrated circuit (ICa) according to the embodiment. FIG. 3 is a so-called ROM-incorporated microcontroller having the built-in-on-chip ROM 4, and FIG. 5 is a so-called RAM-based microcontroller without the built-in-on-chip ROM 4.

The microcontroller having a ROM built therein illustrated in FIG. 3 includes the CPU 13, the RAM 14, an I/O 15, the unique code generating unit 2, a cryptographic IP 16, and the ROM 4, which are coupled to each other via a bus 17. ICa1 is formed on a single semiconductor substrate such as silicon through the use of a well-known production technique of, for example, CMOS (Complementary Metal-Oxide-Semiconductor field effect transistor) LSI, although not particularly limited thereto.

The unique code generating unit 2 is a device which generates a digital value specific to a device as described above. The unique code generating device need not be configured separately from other constituent components. In the case of, for example, the aforementioned SRAM-PUF, configuration using a part of the RAM 14 is also possible.

The ROM 4 has a program or data accessible from the CPU 13 stored therein as a value encrypted using the common key CK(1) which is the predetermined cryptographic key. The cryptographic IP 16 generates the common key CK(1) from the unique code UC(a) supplied from the unique code generating unit 2 and the correction parameter CD(1, a), decrypts the value D(CK(1)) read out from the ROM 4, and supplies it to the CPU 13. If the value D(CK(1)) read out from the ROM 4 is a program, the CPU 13 fetches and executes the decrypted program code, or makes use of the code for arithmetic processing or the like if the value D(CK(1)) is data.

The RAM-based microcontroller illustrated in FIG. 5 also includes the CPU 13, the RAM 14, the I/O 15, the unique code generating unit 2, and the cryptographic IP 16, which are coupled to each other via the bus 17, without the ROM 4 being built therein. Although not particularly limited thereto, the RAM-based microcontroller can also be formed on a single semiconductor substrate such as silicon by using, for example, the well-known CMOSLSI production technique, and it is not necessary to include a process of forming a non-volatile memory, and thus a yield rate is enhanced in proportion to the production cost being lower than the ROM-incorporated microcontroller and the lower defect density per unit chip area, whereby production cost can be suppressed to be small.

Generally, with a RAM-based microcontroller, a program code of a program to be executed and data used by the program are stored in an externally attached ROM, and are executed by the CPU 13 accessing the RAM 14 after having been transferred to the on-chip RAM 14 by a boot-up sequence immediately after power-on. This is because the operation speed is limited since more access cycles than an on-chip memory are required in order that the CPU 13 may access an externally attached memory.

In the present embodiment, the externally attached ROM has a program or data accessible from the CPU 13 stored therein as a value encrypted using the common key CK(1) which is the predetermined cryptographic key. Using the aforementioned boot-up sequence, the encrypted value D(CK(1)) is preliminarily transferred from the externally attached ROM to the RAM 14. The cryptographic IP 16 generates the common key CK(1) from the unique code UC(a) supplied from the unique code generating unit 2 and the correction parameter CD(1, a), in the same way as described above. The value D(CK(1)) read by the CPU 13 accessing the RAM 14 is decrypted by the cryptographic IP 16 using the generated common key CK(1), and is supplied to the CPU 13. If the read out value D(CK(1)) is a program, the CPU 13, fetches and executes the decrypted program code, or makes use of the code for arithmetic processing or the like if the value D(CK(1)) is data.

As has been described above, the CPU 13 can make use of the data stored and concealed in the non-volatile memory (ROM 4).

<Writing of Data from CPU to Non-Volatile Memory>

ICa1 can also include an encrypting unit in addition to the cryptographic IP 16. The cryptographic processing unit 3 included in the cryptographic IP 16 may further include a function of encrypting data output from the CPU 13 by using the generated common key CK(1). The CPU 13 is configured to be able to write data into the ROM 4, after the data to be written into the ROM 4 has been encrypted by the cryptographic processing unit 3. At this time, the ROM 4 is an electrically rewritable memory.

Accordingly, also in the case where there exists data to be added or changed in the ROM 4 while ICa1 is being used, the data can be concealed.

Although an example in which a function of the cryptographic processing unit 3 is executed by the cryptographic IP 16 is illustrated in the embodiments described above, the function of the cryptographic processing unit 3 may also be executed by software of the CPU 13. In such a case, a configuration without the cryptographic IP 16 can be employed, or a configuration as an accelerator for accelerating a part of the cryptographic operation processing is also possible. In addition, the correction parameter CD(1, a) may be supplied to the common key generating unit 5 in any manner. For example, the correction parameter may be held in the same chip of ICa1 and supplied therefrom, or may be supplied from the outside of ICa1.

[Second Embodiment]<IC Including Key Database on Chip>

Figure 6:
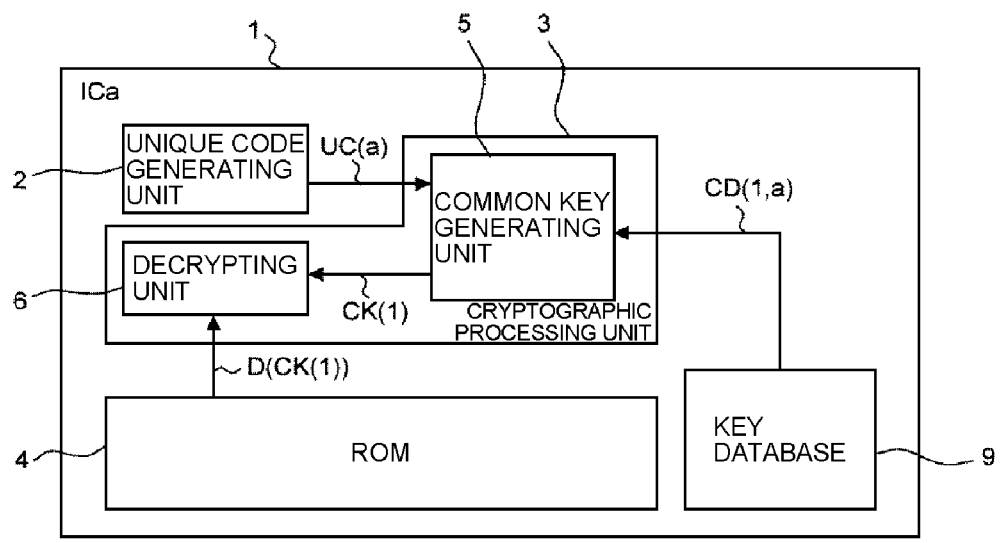
FIG. 6 is a block diagram illustrating a configuration of a semiconductor integrated circuit (ROM-incorporated) according to a second embodiment.

FIG. 6 shows a block diagram illustrating a (ROM-incorporated) configuration of the semiconductor integrated circuit (ICa) 1 according to a second embodiment. The difference from the first embodiment in FIG. 2 lies in the fact that ICa1 is configured to include a key database 9. The correction parameter CD(1, a) calculated by an off-line processing 20 is preliminarily stored in the key database 9, and the correction parameter CD(1, a) is held in the same chip. Explanation of the configuration of the parts similar to FIG. 2 is omitted.

The key database 9 can define, for example, a predetermined region in the ROM 4, store the correction parameter CD(1, a) in the region, and read the correction parameter CD(1, a) into the common key generating unit 5 at an initial sequence such as the power-on processing, the boot processing, the reset processing or the like. In addition, key database 9 may include a non-volatile memory other than the ROM 4 and hold the correction parameter CD(1, a) therein.

Figure 7:
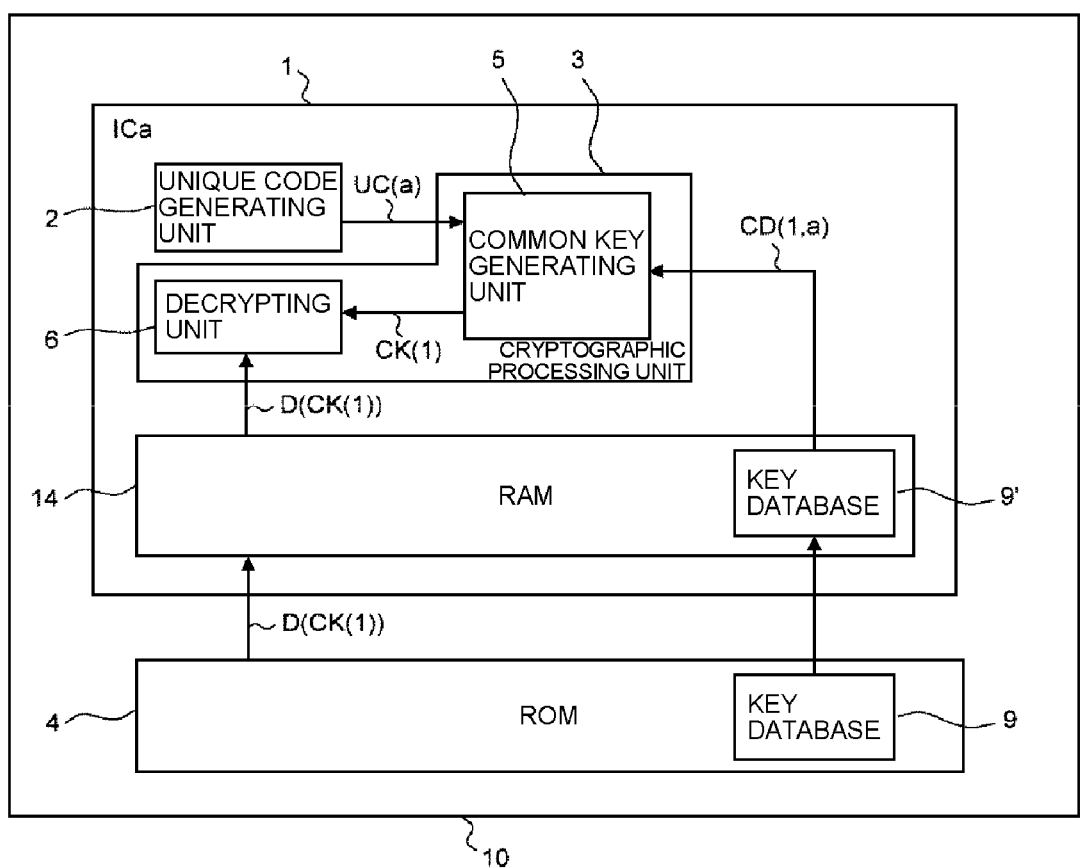
FIG. 7 is a block diagram illustrating a (RAM-based) configuration of the semiconductor integrated circuit according to the second embodiment.

Furthermore, the ROM content protection system may be configured with ICa1 having the ROM 4 externally attached thereto, without having the ROM 4 built therein. FIG. 7 is a block diagram illustrating a (RAM-based) configuration of the semiconductor integrated circuit according to the second embodiment. The difference from the first embodiment illustrated in FIG. 4 lies in the fact that ICa1 is configured to include the key database 9. The correction parameter CD(1, a) calculated by the off-line processing 20 is preliminarily stored in the key database 9 of the ROM 4 externally attached thereto. The key database 9 is transferred to the on-chip RAM 14 by the boot-up sequence or the like and the correction parameter CD(1, a) is held in the same chip. Explanation of the configuration of the parts similar to FIGS. 2 and 4 is omitted.

Accordingly, data communication for transmitting the correction parameter CD(1, a) from the outside of the chip can be made unnecessary. Since the correction parameter is transmitted from the outside of the chip or system, the risk that the value in transmission is observed by an attacker or searched by repeated trials, and thus the value of the correction parameter CD(1, a) is known can be reduced, whereby security of the semiconductor integrated circuit (ICa) 1 and the ROM content protection system can be enhanced.

[Third Embodiment]<Externally Attaching Management IC (ICs) Including Key Database>

Figure 8:
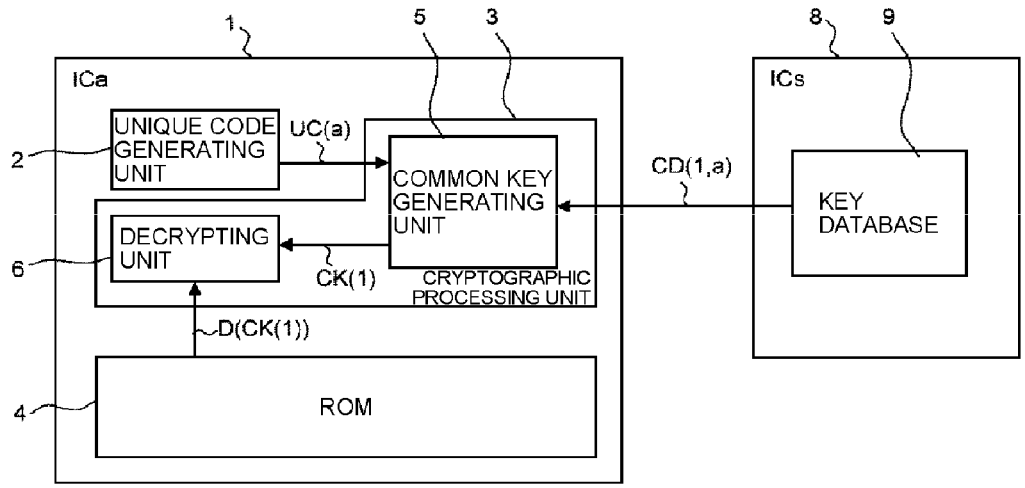
FIG. 8 is a block diagram illustrating a configuration of a (ROM-incorporated) semiconductor integrated circuit and a system according to a third embodiment.

FIG. 8 is a block diagram illustrating a (ROM-incorporated) configuration of the semiconductor integrated circuit (ICa) 1 and the ROM content protection system 10 configured to include ICa according to a third embodiment. The difference from the second embodiment illustrated in FIG. 3 lies in the fact that ICa1 does not include the key database 9 in an on-chip manner, but instead, a management IC (ICs) 8 having the key database 9 is externally attached thereto, which supplies the correction parameter CD(1, a) to ICa1. The correction parameter CD(1, a) calculated by the off-line processing 20 (illustration omitted) is preliminarily stored and held in the key database 9 of ICs 8. Explanation of the configuration of the parts similar to FIGS. 1, 2 and 6 is omitted.

Figure 9:
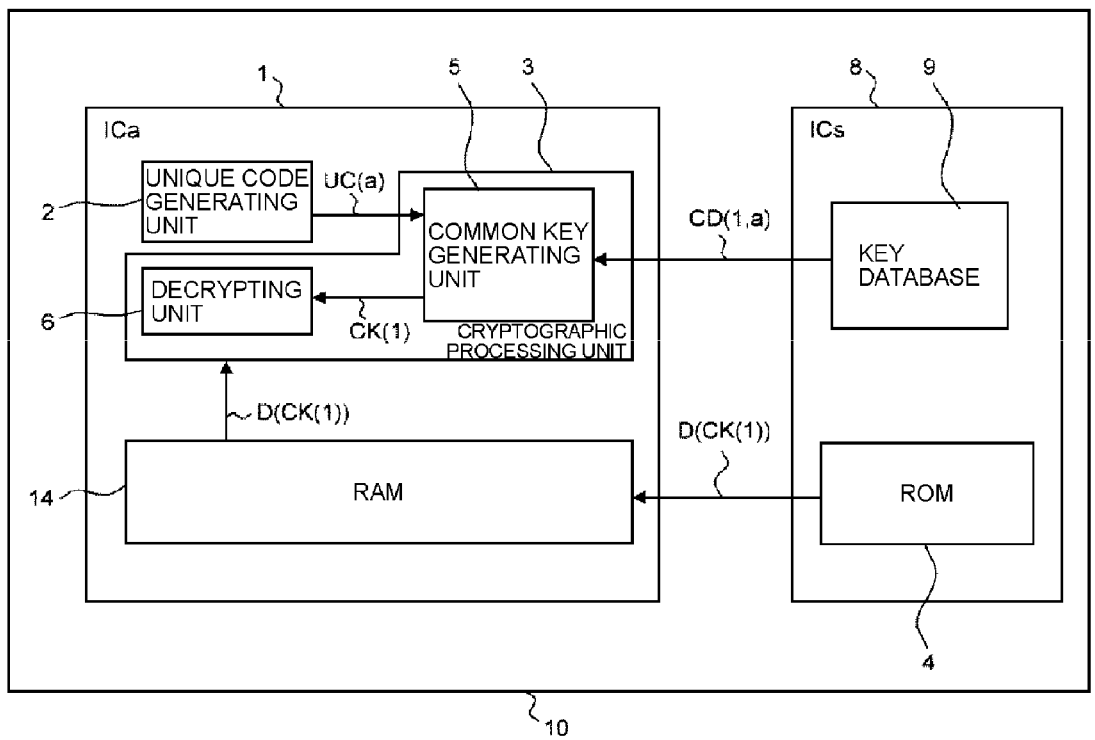
FIG. 9 is a block diagram illustrating a configuration of a (RAM-based) semiconductor integrated circuit and a system according to the third embodiment.

FIG. 9 is a block diagram illustrating a configuration of a (RAM-based) semiconductor integrated circuit and a system according to the third embodiment. The ICa1 is a semiconductor integrated circuit without the ROM 4 built therein as illustrated in FIGS. 4 and 5. The externally attached management IC (ICs) 8 has the ROM 4 built therein. The ROM 4 has the encrypted value D(CK(1)) stored therein, which is transferred to the RAM 14 in ICa1 immediately after powered on by using, for example, a boot-up sequence. As with the case of FIG. 8, the correction parameter CD(1, a) calculated by the off-line processing 20 (illustration omitted) is preliminarily stored and held in the key database 9 of ICs 8, and supplied from the management IC (ICs) 8 to ICa1. Explanation of the configuration of the parts similar to FIGS. 1, 7 and 7 is omitted. Although a case where the ROM 4 is built in the management IC (ICs) 8 has been described, the ROM 4 may be externally attached separately from ICs 8.

As described above, the encrypted value D(CK(1)) to be stored in the ROM 4 and the correction parameter CD(1, a) for generating the common key CK(1) which is the cryptographic key for decrypting the encrypted code are managed by separate chips, whereby security can be enhanced.

In addition, the management IC (ICs) 8 can be separated from the off-line processing 20 and configured not so as to hold therein the cryptographic key CK(1), the encryption step 23, content of the correction parameter calculation step 21 and input/output data thereof, intermediate data or the like, but so as to hold only the key database 9 which is the result thereof. Accordingly, even if the management IC (ICs) 8 is used in an insecure environment, security of the ROM content protection system 10 as a whole can be enhanced.

[Fourth Embodiment]<A Plurality of ICs(ICa, ICb) to be Protected and a Single Management IC(ICs)>

Figure 10:
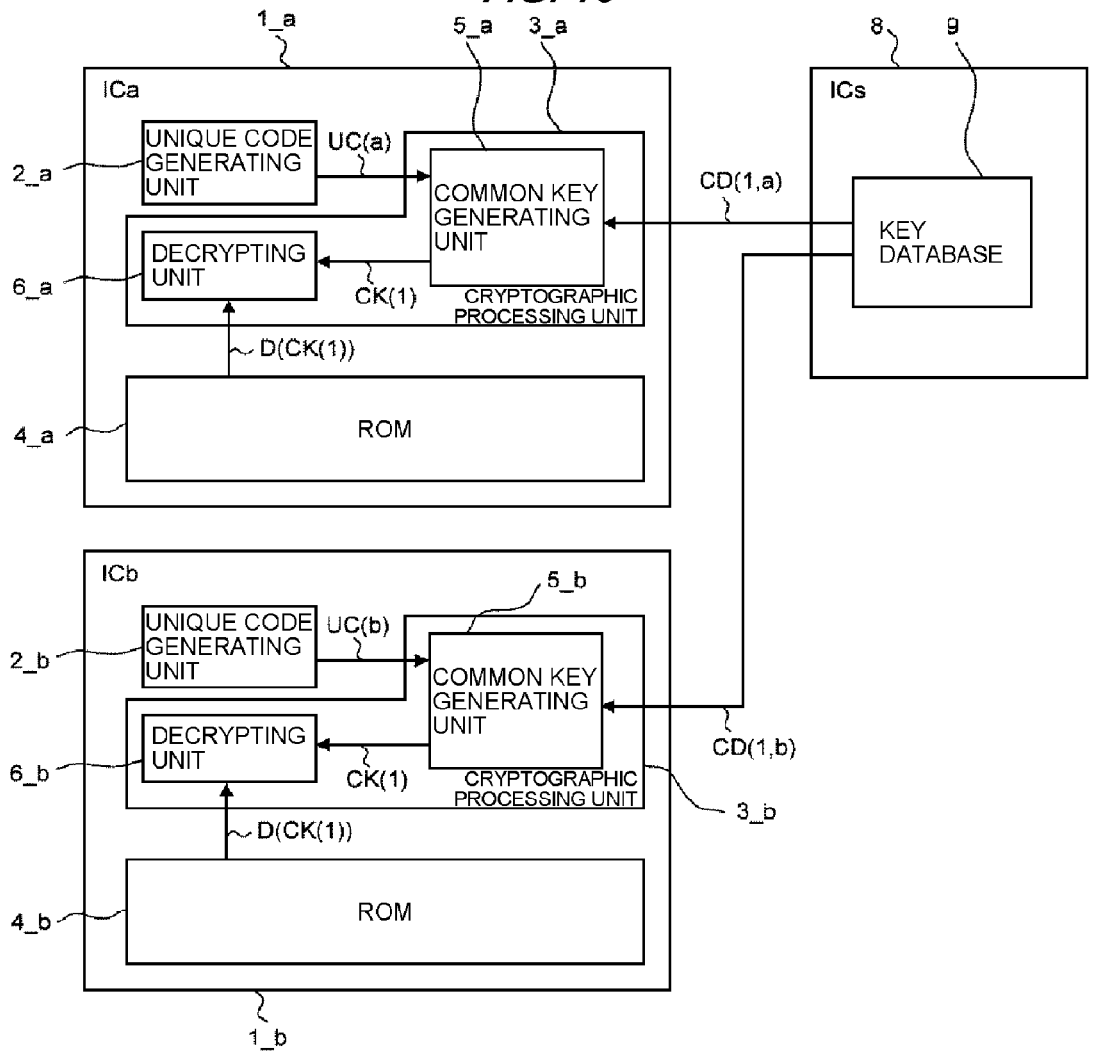
FIG. 10 is a block diagram illustrating a configuration of semiconductor integrated circuits and a ROM content protection system according to a fourth embodiment.

FIG. 10 is a block diagram illustrating a configuration of semiconductor integrated circuits (ICa, ICb) 1_a and 1_b, and the ROM content protection system 10 configured to include ICa and ICb according to a fourth embodiment. The difference from the third embodiment illustrated in FIG. 8 lies in the fact that the ICb (1_b) similarly configured, other than ICa (1_a) illustrated in FIG. 8, is coupled to a single management IC (ICs) 8. Although only two ICs(ICa, ICb) to be protected are illustrated in FIG. 10, the number of coupled ICs to be protected can be arbitrarily determined.

Each of the semiconductor integrated circuits (ICa, ICb) 1_a and 1_b is configured to include non-volatile memories (ROM) 4_a and 4_b, unique code generating units 2_a and 2_b, and cryptographic processing units 3_a and 3_b.

Each of the non-volatile memories (ROM) 4_a and 4_b has stored therein the values D(CK(1, a)) and D(CK(1, b)) encrypted using the common keys CK(1, a) and CK(1, b) corresponding to each of ICa (1_a) and ICb (1_b). Encryption may be performed using different common keys (CK(1, a)#CK(1, b)) respectively for ICa (1_a) and ICb (1_b), or may be performed using the same common key CK(1)(=CK (1, a)=CK(1, b)). FIG. 5 illustrates an exemplary encryption using the same the common key CK(1). Since it is not necessary to change the code to be written into the ROM 4 for each individual, which is suited for mass production. On the other hand, using a different cryptographic key for each individual results in an improved security.

The key database 9 included in the management IC (ICs) 8 holds a plurality of correction parameter CDs (1, a) and CDs (1, b) in association with each of the semiconductor integrated circuits (ICa, ICb) 1_a and 1_b, and supplies the correction parameters to the corresponding semiconductor integrated circuits. The correction parameter CD(1, a) is supplied to ICa (1_a), and the common key generating unit 5_a generates the common key CK(1) referring to the unique code UC(a). The decrypting unit 6_a decrypts the encrypted data D(CK(1)) stored in the ROM 4_a using the generated common key CK(1). On the other hand, the correction parameter CD(1, b) is supplied to ICb (1_b), and the common key generating unit b generates the common key CK(1) referring to the unique code UC(b). The decrypting unit 6_b decrypts encrypted data D(CK(1)) stored in the ROM 4_b using the generated common key CK(1).

Figure 11:
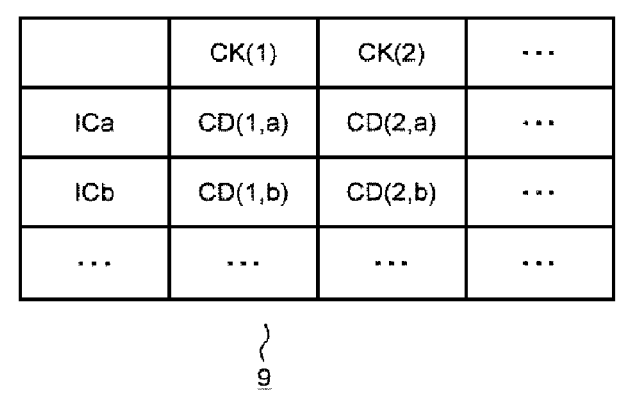

FIG. 11 is an explanatory diagram illustrating an exemplary configuration of the key database 9 included in the management IC (ICs) 8 according to the fourth embodiment. The key database 9 is a database which stores a plurality of correction parameters corresponding to the common keys CK(1), CK(2), . . . for each of the semiconductor integrated circuits ICa, ICb, . . . .

The correction parameter CD(1, a) is a correction parameter preliminarily calculated at the outside of the system, on the basis of the initial unique code UC(a)_init generated from the unique code generating unit 2_a after production of the corresponding ICa, and the common key CK(1). The correction parameter CD(2, a), also based on the initial unique code UC(a)_init of the corresponding ICa, is a correction parameter for generating another common key CK(2). Also as to other semiconductor integrated circuits ICb or the like, corresponding correction parameters CD(1, b) and CD(2, b) are preliminarily calculated at the outside of the system in the same way and stored in the key database 9. The example illustrated in FIG. 10 is one having the value D(CK(1)) encrypted using the same common key CK(1) stored in the ROM 4_a and the ROM 4_b, and thus CD(2, a) and CD(2, b) are not used. When a program or data of the ROM 4_a and the ROM. 4_b have been encrypted respectively using different common keys CK(1) and CK(2), it suffices that CD(1, a) is supplied to ICa and CD(2, b) is supplied to ICb.

In addition, any method of supplying the correction parameter CD will do. For example, the management IC (ICs) 8 may be provided with wirings respectively coupled to ICa, ICb, . . . , and thus the correction parameters CD(1, a), CD(1, b), . . . may be supplied by parallel communication or serial communication. Alternatively, by provision of a common bus or a communication path, correction parameters may be individually transmitted by communication using an identification code or the like.

Accordingly, the ROM content protection system 10 having mounted thereon the semiconductor integrated circuits (1_a, 1_b) with an enhanced security can be constructed. The system may be configured with a plurality of the same semiconductor integrated circuits mounted thereon, configured to include different types of semiconductor integrated circuit, or configured to include a plurality of the same semiconductor integrated circuits and different types of semiconductor integrated circuits.

Although FIG. 10 illustrates the semiconductor integrated circuits (ICa, ICb) 1_a and 1_b respectively having the ROMs 4_a and 4_b built therein, the ROMs 4_a and 4_b need not necessarily be built therein, but may be externally attached thereto as illustrated in, for example, FIGS. 4 and 7. In addition, they need not necessarily be externally attached as respective separate ROMs, but a single ROM storing all the content may be configured to be built in ICs 8. In such a case, the encrypted values D(CK(1, a)) and D(CK(1, b)) are sequentially transferred to respective semiconductor integrated circuits (ICa, ICb) 1_a and 1_b by the boot-up sequence or the like.

[Fifth Embodiment]<Supply of Correction Parameter Via network>

Figure 12:
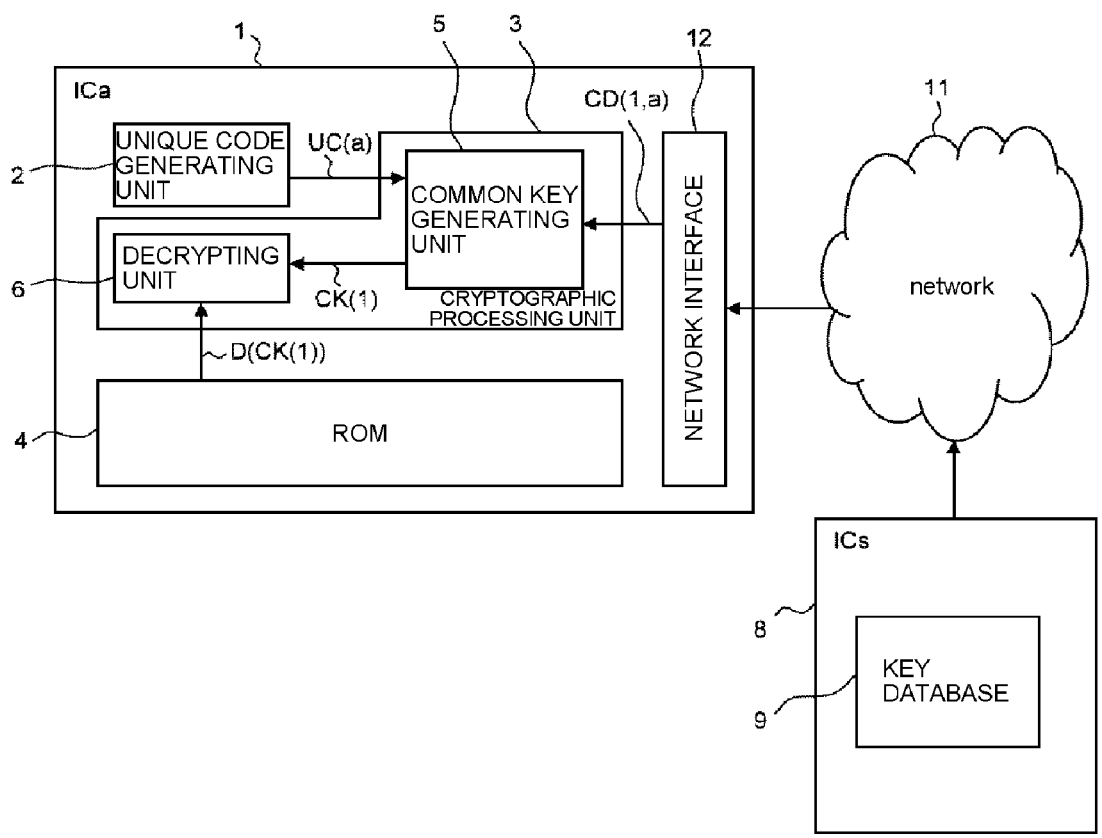
FIG. 12 is a block diagram illustrating a configuration of a semiconductor integrated circuit and a ROM content protection system according to a fifth embodiment.

FIG. 12 is a block diagram illustrating a configuration of the ROM content protection system 10 configured to include the semiconductor integrated circuit (ICa) 1 and ICa according to a fifth embodiment. The difference from the third embodiment illustrated in FIG. 8 lies in the fact that ICa1 is configured to include a network interface 12 to be coupled to the management IC (ICs) 8 via a network 11. ICa1 can receive, via the network 11, the correction parameter CD(1, a) to be stored in the key database 9 of ICs 8. Explanation of the configuration of the parts similar to FIG. 8 is omitted.

The network 11 may be a public network, a Local Area Network (LAN), or a simpler network such as one having an original communication protocol, and may include a 1:1 communication path illustrated in FIG. 8 or an n:1 communication path illustrated in FIG. 10.

Accordingly, the correction parameter CD(1, a) which is information corresponding to the cryptographic key can be distributed, also via the network 11, to an IC to be protected in a state of ensured security. The information transmitted via the network 11 is not the common key CK(1) itself but is the correction parameter CD(1, a) and thus, even if the information is known, the common key CK(1) cannot be generated unless the unique code UC(a) is known. Therefore, security can be ensured even if the correction parameter CD(1, a) is transmitted via the network 11.

Although FIG. 12 illustrates the semiconductor integrated circuit (ICa) 1 having the ROM 4 built therein, the ROM 4 need not necessarily be built therein, but may be externally attached thereto as illustrated in, for example, FIGS. 4 and 7. In such a case, the encrypted value D(CK(1, a)) is transferred by the boot-up sequence when, for example, powered on. In addition, the encrypted value D(CK(1, a)) may be downloaded from ICs 8 to ICa1 via the network 11.

[Sixth Embodiment]<A Plurality of Correction Parameters for ROM Protection Encrypted Code, Authentication Encrypted Code, or the Like>

As illustrated in FIG. 11, the key database 9 can hold a plurality of correction parameters for generating a plurality of common keys for respective integrated circuits to be protected. The common keys can be properly used for each intended use. For example, the common key CK(1) can be used for encryption of a program, another common key CK(2) can be used for encryption of data, and still another common key CK(3) can be used for encryption of communication. In addition, different common keys can also be used among a plurality of ICs to be protected, or mutual communication can also be encrypted using the same common key. A more detailed description is given by taking a total of three examples, namely the sixth, seventh and eighth embodiments.

<Generation of a Plurality of Cryptographic Keys from a Single Unique Code>

The cryptographic key used for encryption of the value to be stored in the non-volatile memory (ROM) 4 mounted in ICa1 is defined as the first common key CK(1), the key database 9 holds a plurality of correction parameter CDs (1, a), CD(2, a), . . . in association with ICa1 and supplies them to ICa1. The cryptography processing unit 3 of ICa1 calculates the first common key CK(1) and another common key CK(2) different therefrom, on the basis of the supplied correction parameters CDs (1, a), CD(2, a), . . . and the unique code UC(a) generated from the unique code generating unit 2. Using the first common key CK(1) calculated in the decrypting unit 6, the cryptography processing unit 3 can decrypt the encrypted value D(CK(1)) read out from the ROM 4.

Accordingly, the cryptographic keys (CK(1), CK(2), . . . ) can be properly used for each intended use, whereby security of the semiconductor integrated circuit can be further enhanced and security of the entire system can also be enhanced.

<Generation of Cryptographic Keys for Decrypting and Authentication from a Single Unique Code>

Figure 13:
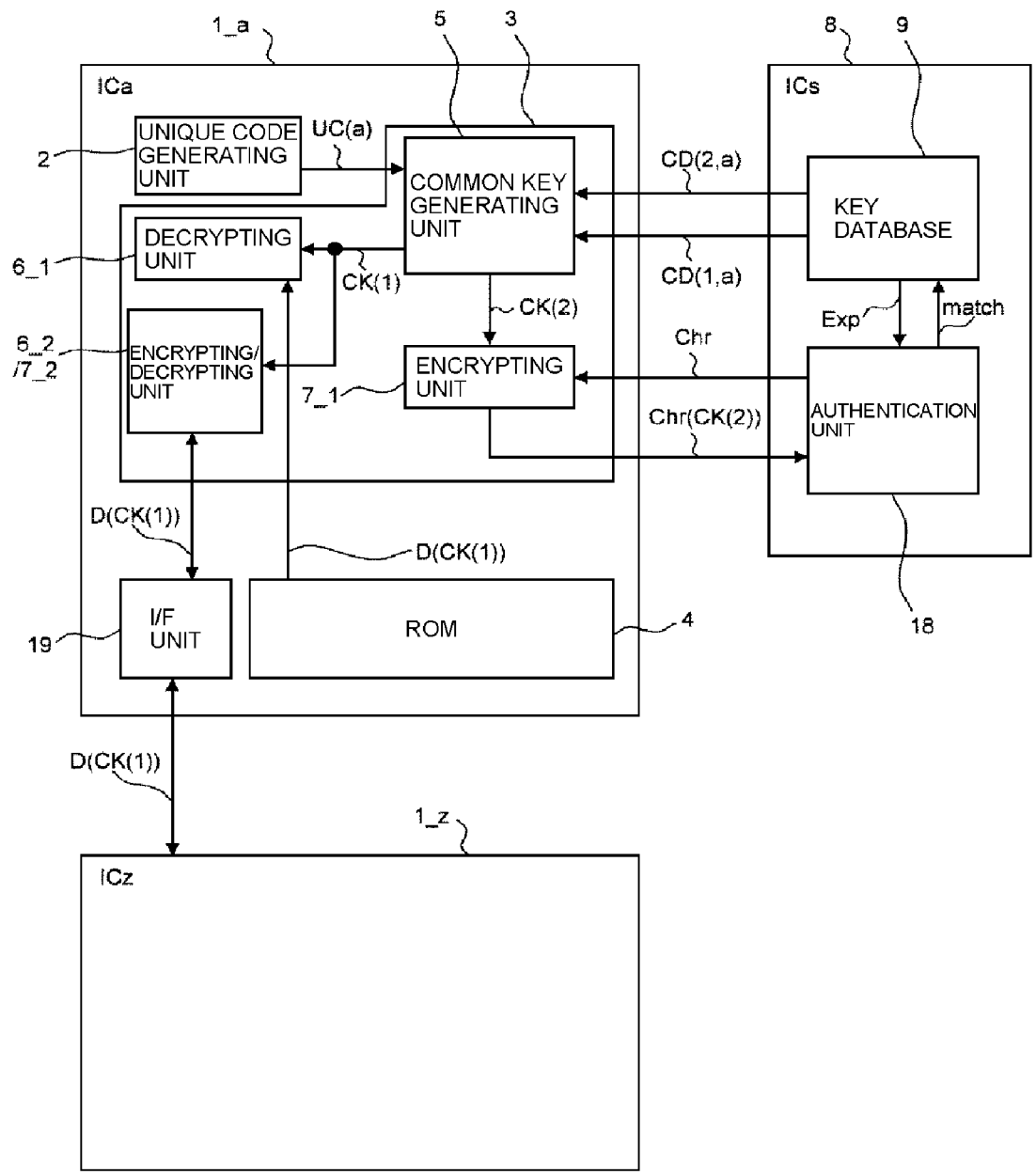
FIG. 13 is a block diagram illustrating a configuration of a semiconductor integrated circuit and a ROM content protection system according to a sixth embodiment.

FIG. 13 is a block diagram illustrating a configuration of the ROM content protection system 10 configured to include the semiconductor integrated circuit (ICa) 1_a and ICa according to the sixth embodiment. This is an example of generating two cryptographic keys CK(1) and CK(2) from a single unique code UC(a), of using the common key CK(1) for decrypting the encrypted value D(CK(1)) to be stored in the ROM 4, and of using the other common key CK(2) for authentication. ICa (1_a) is coupled to the management IC (ICs) 8 and further coupled to another ICs (ICz) 1_z to be protected, and configured to include the non-volatile memory (ROM) 4, the unique code generating unit 2, the cryptographic processing unit 3, and an interface unit 19. The cryptographic processing unit 3 includes the common key generating unit 5, decrypting units 6_1 and 6_2, and encrypting units 7_1 and 7_2. The ROM 4 has stored therein a program and/or data D(CK(1)) encrypted using the common key CK(1). FIG. 13 illustrates the decrypting unit 6_2 and encrypting unit 7_2 in a single block, which are coupled via the interface unit 19 to another IC (ICz) 1_z to be protected. The management integrated circuit (ICs) 8 further includes an authentication unit 18, in addition to the key database 9. The authentication unit 18 of the management IC (ICs) 8 is coupled to the encrypting unit 7_1 of ICa (1_a).

Operation of the system configured to include ICa (1_a) and ICa will be described. ICs 8 holds, in the key database 9, the correction parameter CD(1, a) corresponding to the common key CK(1) and the correction parameter CD(2, a) corresponding to the common key CK(2). Furthermore, Chr(CK(2)) obtained by encrypting challenge data Chr for authentication by using the common key CK(2) is held as an expectation value Exp. A value of a random number, for example, can be used as the challenge data Chr. A plurality of challenge data Chr_1 to Chr_x and expectation values Exp_1 to Exp_x respectively corresponding thereto can be used sequentially or being switched or at random. As described above, preparing a plurality of candidates and switching therebetween leads to an enhanced security.

First, ICs 8 transmits, to ICa (1_a), the correction parameter CD(2, a) from the key database 9 and the challenge data Chr from the authentication unit 18. Referring to the unique code UC(a) generated from the unique code generating unit 2, ICa (1_a) generates, in the common key generating unit 5, the common key CK(2) by using the received correction parameter CD(2, a), and supplies it to the encrypting unit 7_1. The encrypting unit 7_1 encrypts the challenge data Chr received from ICs 8 through the use of the common key CK(2) and returns the encrypted challenge data (Chr(CK(2))) to ICs 8. ICs 8 compares the encrypted and returned challenge data Chr(CK(2)) with the challenge data expected value Exp in the authentication unit 18. In the case of a match, ICa is authenticated as an authentic IC to be protected.

After having authenticated ICa as an authentic IC to be protected, the management IC (ICs) 8 supplies the correction parameter CD(1, a) to ICa. For example, the authentication unit 18 is configured to compare the encrypted and returned challenge data Chr(CK(2)) with the challenge data expected value Exp, and in the case of a match, output the result of matching "match" to the key database 9, and on the basis of the result, supply the correction parameter CD(1, a) from the key database 9 to ICa. Referring to the unique code UC(a) generated from the unique code generating unit 2, ICa (1_a) generates, in the common key generating unit 5, the common key CK(1) by using the received correction parameter CD(1, a), and supplies it to the decrypting unit 6_1. As with the first and the fourth embodiments, the decrypting unit 6_1 can decrypt the encrypted value D(CK(1)) read out from the ROM 4 by using the calculated common key CK(1).

The calculated common key CK(1) may be further supplied to the decrypting unit 6_2 and the encrypting unit 7_2. Cryptographic communication via the interface unit 19 can be performed with ICz (1_z) which is another IC to be protected having the same the common key CK(1). Although an example of performing encryption by using the same cryptographic key (common key CK(1)) as the key for protection of the content of the ROM 4 has been shown in the present embodiment for cryptographic communication with ICz (1_z), other cryptographic keys (common key CK(3) or the like) may also be used.

The decrypting units 6_1 and 6_2 and the encrypting units 7_1 and 7_2 may be implemented as a single cryptographic module. Sequentially performing decryption and encryption operation for the decrypting units 6_1 and 6_2 and the encrypting units 7_1 and 7_2 in a time divided manner makes it possible to realize a smaller circuit scale than a parallel configuration.

Accordingly, one of the cryptographic keys, CK(2), can be used for authentication, whereby security of the semiconductor integrated circuit (ICa) can be further enhanced and security of the entire ROM content protection system 10 can also be enhanced.

Although FIG. 13 illustrates the semiconductor integrated circuits (ICa and ICz) 1_a and 1_z, each having the ROM 4 built therein, the ROM 4 need not necessarily be built therein, but may be externally attached thereto as illustrated in, for example, FIGS. 4 and 7. In such a case, the encrypted values D(CK(1, a)) and D(1, CK z) are respectively transferred to ICa (1_a) and ICz (1_z) by the boot-up sequence when powered on, for example. The ROM 4 may be externally attached to ICa (1_a) and ICz (1_z) respectively, or may be configured so that one of the ROMs 4 including the both contents is externally attached thereto and respective contents thereof are sequentially transferred to ICa (1_a) and ICz (1_z). One of the ROMs 4 may be built in the management IC (ICs).

[Seventh Embodiment]<IC Including on-Chip Correction Parameter for Encrypted Code for Authentication>

Figure 14:
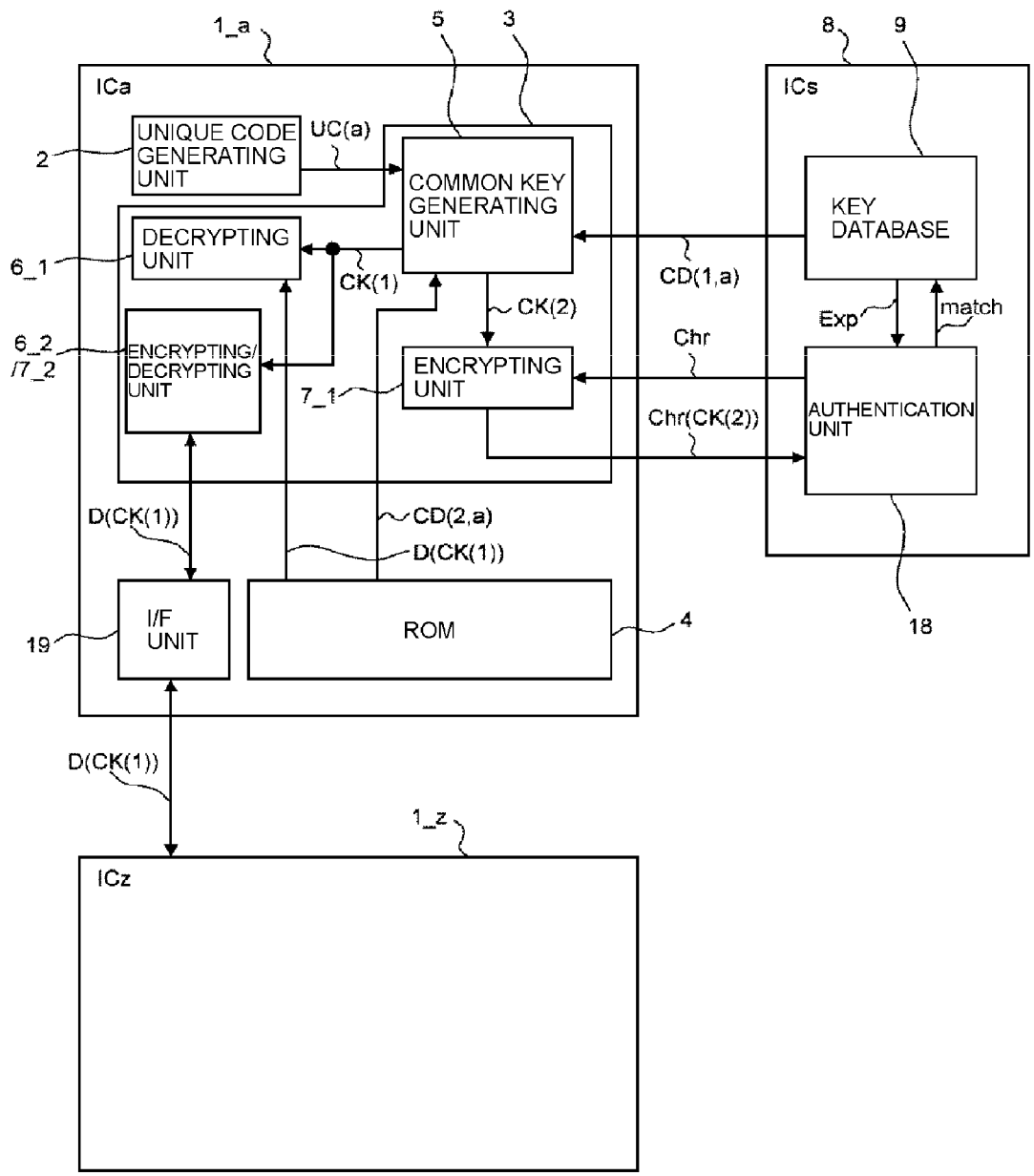
FIG. 14 is a block diagram illustrating a configuration of a semiconductor integrated circuit and a ROM content protection system according to a seventh embodiment.

FIG. 14 is a block diagram illustrating a configuration of the ROM content protection system 10 configured to include the semiconductor integrated circuits (ICa) 1_a and ICa according to a seventh embodiment. The difference from the sixth embodiment illustrated in FIG. 13 lies in the fact that the correction parameter CD(2, a) corresponding to the common key CK(2) used for authentication is stored in the ROM 4 of ICa (1_a) and supplied to the common key generating unit 5 when performing authentication. Since the configuration of other parts is similar to the sixth embodiment described referring to FIG. 13, explanation thereof is omitted.

Operation of the system configured to include ICa (1_a) and ICa will be described. ICs 8 holds, in the key database 9, the correction parameter CD(1, a) corresponding to the common key CK(1) and Chr(CK(2)) obtained by encrypting the challenge data Chr for authentication using the common key CK(2) as the expectation value Exp. First, ICs 8 transmits the challenge data Chr from the authentication unit 18 to ICa (1_a). Referring to the unique code UC(a) generated from the unique code generating unit 2, ICa (1_a) generates, in the common key generating unit 5, the common key CK(2) by using the correction parameter CD(2, a) to be stored in the ROM 4, and supplies it to the encrypting unit 7_1. The encrypting unit 7_1 encrypts the challenge data Chr received from ICs 8 through the use of the common key CK(2) and returns the encrypted challenge data (Chr (CK(2))) to ICs 8. Since the subsequent operation is similar to the sixth embodiment described referring to FIG. 13 and explanation thereof is omitted.

One of the cryptographic keys, CK(2), can be used for authentication in the seventh embodiment, as with the aforementioned sixth embodiment, whereby security of the semiconductor integrated circuit (ICa) can be further enhanced and security of the entire ROM content protection system 10 can also be enhanced.

Although FIG. 14 illustrates the semiconductor integrated circuits (ICa and ICz) 1_a and 1_z, each having the ROM 4 built therein, the ROM 4 need not necessary be built therein, but may be externally attached thereto as illustrated in, for example, FIGS. 4 and 7. In such a case, the encrypted values D(CK(1, a)) and D(CK1, z) are respectively transferred to ICa (1_a) and ICz (1_z) by the boot-up sequence when powered on, for example. The ROM 4 may be externally attached to ICa (1_a) and ICz (1_z) respectively, or may be configured so that one of the ROMs 4 including the both contents is externally attached thereto and respective contents thereof are sequentially transferred to ICa (1_a) and ICz (1_z). One of the ROMs 4 may be built in the management IC (ICs).

[Eighth Embodiment]<Public Key Authentication>

As illustrated in FIG. 11, the key database 9 can hold a plurality of correction parameters for generating a plurality of common keys for respective integrated circuits to be protected. As described above, the common keys can be properly used for each intended use. The eighth embodiment is an example of generating two cryptographic keys CK(1) and CK(2) from a single unique code UC(a), of using the common key CK(1) for decrypting the encrypted value D(CK(1)) to be stored in the ROM 4, and of using the other the common key CK(2) for authentication. The common key CK(2) used for authentication is a secret key (SK) and the management IC (ICs) 8 holds the corresponding public key (PK).

Figure 15:
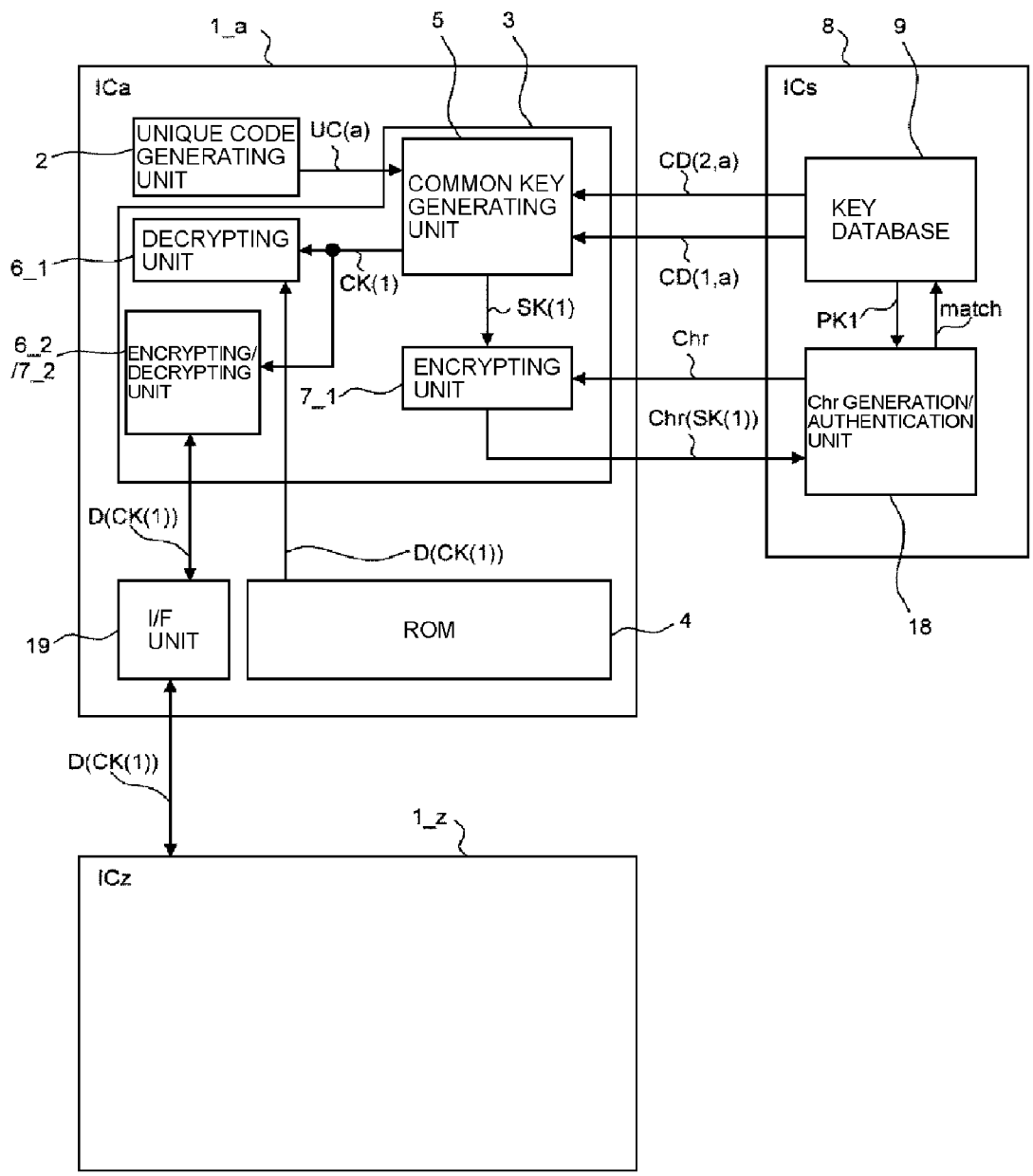
FIG. 15 is a block diagram illustrating a configuration of a semiconductor integrated circuit and a ROM content protection system according to an eighth embodiment.

FIG. 15 is a block diagram illustrating the configuration of the semiconductor integrated circuit and the ROM content protection system according to the eighth embodiment, and FIG. 16 is an explanatory diagram illustrating an exemplary configuration of the key database 9.

FIG. 15 is a block diagram illustrating a configuration of the ROM content protection system 10 configured to include the semiconductor integrated circuit (ICa) 1_a and ICa according to the eighth embodiment. This is an example of generating two cryptographic keys, i.e., the common key CK(1) and a secret key SK(1) from a single unique code UC(a), using the common key CK(1) for decrypting the encrypted value D(CK(1)) to be stored in the ROM 4 and using the secret key SK(1) for authentication. ICa (1_a) is coupled to the management IC (ICs) 8 and further coupled to another ICs (ICz) 1_z to be protected, and configured to include the non-volatile memory (ROM) 4, the unique code generating unit 2, the cryptographic processing unit 3, and the interface unit 19. The cryptographic processing unit 3 includes the common key generating unit 5, the decrypting units 6_1 and 6_2, and the encrypting units 7_1 and 7_2. The ROM 4 has stored therein a program and/or data D(CK(1)) encrypted using the common key CK(1). FIG. 15 illustrates the decrypting unit 6_2 and the encrypting unit 7_2 in a single block, which are coupled via the interface unit 19 to another IC (ICz) 1_z to be protected. The management integrated circuit (ICs) 8 includes the authentication unit 18, in addition to the key database 9. The authentication unit 18 of the management IC (ICs) 8, also being configured to be capable of generating the challenge data Chr, is coupled to the encrypting unit 7_1 of ICa (1_a).

Operation of the system configured to include ICa (1_a) and ICa will be described. ICs 8 holds, in the key database 9, the correction parameter CD(1, a) corresponding to the common key CK(1) and the correction parameter CD(2, a) corresponding to the secret key SK(1). ICs 8 sends, to ICa (1_a), the correction parameter CD(2, a) corresponding to the secret key SK(1) and the challenge data Chr for authentication.

Referring to the unique code UC(a) generated from the unique code generating unit 2, ICa (1_a) generates, in the common key generating unit 5, the secret key SK(1) by using the received correction parameter CD(2, a), and supplies it to the encrypting unit 7_1. The encrypting unit 7_1 encrypts the challenge data Chr received from ICs 8 through the use of the secret key SK(1) and returns the encrypted challenge data (Chr(SK(1)) to ICs 8. ICs 8 decrypts the encrypted and returned challenge data Chr(SK(1)) in the authentication unit 18 by using the public key PK(1), and compares it with the transmitted challenge data Chr. In the case of a match, ICa is authenticated as an authentic IC to be protected. The authentication unit 18 is configured to output, in the case of a match, the result of matching "match" to the key database 9 and, on the basis of the result, supply the correction parameter CD(1, a) from the key database 9 to ICa.

After having authenticated ICa as an authentic IC to be protected, and the management IC (ICs) 8 supplies the correction parameter CD(1, a) to ICa. Referring to the unique code UC(a) generated from the unique code generating unit 2, ICa (1_a) generates, in the common key generating unit 5, the common key CK(1) using the received correction parameter CD(1, a), and supplies it to the decrypting unit 6_1. As with the first and the fourth embodiments, the decrypting unit 6_1 can decrypt the encrypted value D(CK(1)) read out from the ROM 4 by using the calculated common key CK(1).

The calculated common key CK(1) may be further supplied to the decrypting unit 6_2 and the encrypting unit 7_2. Cryptographic communication via the interface unit 19 can be performed with ICz (1_z) which is another IC to be protected having the same the common key CK(1). Although an example of performing encryption by using the same cryptographic key (common key CK(1)) as the key for protection of the content of the ROM 4 has been shown in the present embodiment for cryptographic communication with ICz (1_z), other cryptographic keys (common key CK(3) or the like) may also be used.

The decrypting units 6_1 and 6_2 and the encrypting units 7_1 and 7_2 may be implemented as a single cryptographic module. Sequentially performing decryption and encryption operation by the decrypting units 6_1 and 6_2 and the encrypting unit 7_1 and 7_2 in a time divided manner can make it possible to realize a smaller circuit scale than a parallel configuration.

Accordingly, one of the cryptographic keys, CK(2), can be used for authentication as the secret key SK(1) in the public key authentication system, whereby security of the semiconductor integrated circuit (ICa) can be further enhanced and security of the entire ROM content protection system 10 can also be enhanced.

Although FIG. 15 illustrates the semiconductor integrated circuit (ICa and ICz) 1_a and 1_z, each having the ROM 4 built-in, the ROM 4 need not necessary be built therein, but may be externally attached thereto as with, for example, FIGS. 4 and 7. In such a case, the encrypted values D(CK(1, a)) and D(CK1, z) are respectively transferred to ICa (1_a) and ICz (1_z) by the boot-up sequence or the like when powered on, for example. The ROM 4 may be externally attached to ICa (1_a) and ICz (1_z) respectively, or may be configured so that one of the ROMs 4 including the both contents is externally attached thereto, and the respective contents thereof are sequentially transferred to ICa (1_a) and ICz (1_z). One the ROMs 4 may be built in the management IC (ICs).

Although the invention made by the inventors of the present invention has been specifically described on the basis of embodiments, it is needless to say that the present invention is not limited thereto and a variety of modifications can be made in a range not deviating from its spirit.

What is claimed is:

1. A semiconductor integrated circuit comprising:
a non-volatile memory configured to store a value encrypted using a predetermined cryptographic key;
a unique code generator;
a cryptographic processor; and
a database which holds a correction parameter in association with the semiconductor integrated circuit, and supplies the correction parameter to the semiconductor integrated circuit, wherein the unique code generator is configured to generate a unique code, which is a multi-bit digital value specifically determined by production variation of the semiconductor integrated circuit,
wherein the cryptographic processor is configured to calculate a cryptographic key on the basis of the correction parameter and the generated unique code and, using the calculated cryptographic key, decrypt the encrypted value read out from the non-volatile memory,
wherein the correction parameter is preliminarily calculated at an outside of the semiconductor integrated circuit, on the basis of an initial unique code generated from the unique code generator after production of the semiconductor integrated circuit, and the predetermined cryptographic key,
wherein the cryptographic key used for encryption of the value stored in the non-volatile memory is defined as a first cryptographic key and the correction parameter is defined as a first correction parameter,
wherein the system comprises a management integrated circuit including the database and an authentication unit,
wherein the management integrated circuit holds, in the database, the first correction parameter and a second correction parameter associated with the semiconductor integrated circuit, and holds, in the authentication unit, challenge data and a challenge data expected value obtained by encrypting the challenge data by using a second cryptographic key corresponding to the second correction parameter, and supplies the second correction parameter and the challenge data to the semiconductor integrated circuit, wherein, in the semiconductor integrated circuit, the cryptographic processor generates the second cryptographic key, on the basis of the supplied second correction parameter and the unique code, encrypts the supplied challenge data by using the second cryptographic key, and returns the challenge data to the management integrated circuit,
wherein the management integrated circuit compares the encrypted and returned challenge data with the challenge data expected value held in the authentication unit, and in the case of a match, supplies the first correction parameter to the semiconductor integrated circuit, and
wherein the semiconductor integrated circuit calculates the first cryptographic key, on the basis of the supplied first correction parameter and the unique code, and decrypts the encrypted value read out from the non-volatile memory by using the calculated first cryptographic key.

2. The semiconductor integrated circuit according to claim 1, wherein the cryptographic processor is configured to calculate the cryptographic key on the basis of the correction parameter and the unique code, even when the unique code generated from the unique code generator includes an error relative to the initial unique code.

3. The semiconductor integrated circuit according to claim 1, wherein the correction parameter is held in a chip containing the semiconductor integrated circuit.

4. The semiconductor integrated circuit according to claim 1, further comprising a network interface, and wherein the semiconductor integrated circuit is configured to receive the correction parameter via the network interface.

5. The semiconductor integrated circuit according to claim 1,
wherein the correction parameter is defined as the first correction parameter and the cryptographic key is defined as the first cryptographic key, and
wherein the cryptographic processor is configured to calculate the second cryptographic key different from the first cryptographic key, on the basis of the second correction parameter different from the first correction parameter and the unique code.

6. The semiconductor integrated circuit according to claim 1, further comprising a CPU,
wherein the non-volatile memory is configured to store a value obtained by encrypting a program code of a program executable on the CPU by using the predetermined cryptographic key, and
wherein the CPU is configured to execute the program decrypted by the cryptographic processor.

7. The semiconductor integrated circuit according to claim 6,
wherein the non-volatile memory is configured to store a value obtained by encrypting data accessible from the CPU by using the predetermined cryptographic key, and
wherein the CPU is configured to read the data decrypted by the cryptographic processor.

8. The semiconductor integrated circuit according to claim 6,
wherein the cryptographic processor further includes a function of encrypting data output from the CPU by using the calculated cryptographic key, and
wherein the CPU is configured to write data into the non-volatile memory, after the data to be written into the non-volatile memory has been encrypted by the cryptographic processor.

9. A system comprising:
a semiconductor integrated circuit comprising a unique code generator and a cryptographic processor, a non-volatile memory configured to store a value encrypted using a predetermined cryptographic key, and a database which holds a correction parameter in association with the semiconductor integrated circuit, and supplies the correction parameter to the semiconductor integrated circuit,
wherein the unique code generator is configured to generate a unique code, which is a multi-bit digital value specifically determined by production variation of the semiconductor integrated circuit,
wherein the cryptographic processor is configured to calculate a cryptographic key on the basis of the correction parameter and the unique code, and decrypt the encrypted value read out from the non-volatile memory by using the calculated cryptographic key,
wherein the correction parameter is preliminarily calculated at an outside of the semiconductor integrated circuit, on the basis of the initial unique code generated from the unique code generator after production of the semiconductor integrated circuit, and the predetermined cryptographic key,
wherein the cryptographic key used for encryption of the value stored in the non-volatile memory is defined as a first cryptographic key and the correction parameter is defined as a first correction parameter,
wherein the system comprises a management integrated circuit including the database and an authentication unit,
wherein the management integrated circuit holds, in the database, the first correction parameter and a second correction parameter associated with the semiconductor integrated circuit, and holds, in the authentication unit, challenge data and a challenge data expected value obtained by encrypting the challenge data by using a second cryptographic key corresponding to the second correction parameter, and supplies the second correction parameter and the challenge data to the semiconductor integrated circuit, wherein, in the semiconductor integrated circuit, the cryptographic processor generates the second cryptographic key, on the basis of the supplied second correction parameter and the unique code, encrypts the supplied challenge data by using the second cryptographic key, and returns the challenge data to the management integrated circuit,
wherein the management integrated circuit compares the encrypted and returned challenge data with the challenge data expected value held in the authentication unit, and in the case of a match, supplies the first correction parameter to the semiconductor integrated circuit, and
wherein the semiconductor integrated circuit calculates the first cryptographic key, on the basis of the supplied first correction parameter and the unique code, and decrypts the encrypted value read out from the non-volatile memory by using the calculated first cryptographic key.

10. The system according to claim 9,
wherein the cryptographic processor is configured to calculate the cryptographic key on the basis of the correction parameter and the unique code, even when the unique code generated from the unique code generator includes an error relative to the initial unique code.

11. The system according to claim 9, comprising a plurality of the semiconductor integrated circuits and a database,
wherein each of the semiconductor integrated circuits includes a non-volatile memory, an unique code generator, and a cryptographic processor,
wherein the non-volatile memory has stored therein values encrypted using cryptographic keys corresponding to each of the semiconductor integrated circuits,
wherein the database holds a plurality of the correction parameters in association with each of the semiconductor integrated circuits, and supplies the correction parameters to corresponding semiconductor integrated circuits, and
wherein the correction parameter is preliminarily calculated at an outside of the system and stored in the database, on the basis of an initial unique code generated from the unique code generator after production of a corresponding semiconductor integrated circuit, and a cryptographic key used for encryption of a value stored in the non-volatile memory of the corresponding semiconductor integrated circuit.

12. The system according to claim 9,
wherein the semiconductor integrated circuit further comprises a volatile memory,
wherein the value encrypted using the predetermined cryptographic key is configured to be transferred from the non-volatile memory to the volatile memory, and
wherein the cryptographic processor is configured to decrypt the encrypted value read out from the volatile memory.

13. The system according to claim 12, further comprising a controlled semiconductor integrated circuit configured to include the database which holds the correction parameter in association with the semiconductor integrated circuit and supplies the correction parameter to the semiconductor integrated circuit, and the non-volatile memory.

14. The system according to claim 9,
wherein the semiconductor integrated circuit and the database are coupled via a network, and
wherein the correction parameter is configured to be received by the semiconductor integrated circuit via the network.

15. The system according to claim 9,
wherein the cryptographic key used for encryption of the value stored in the non-volatile memory is defined as the first cryptographic key,
wherein the database holds a plurality of the correction parameters in association with the semiconductor integrated circuit and supplies the correction parameters to the semiconductor integrated circuit; and
wherein the cryptographic processor is configured to calculate the first cryptographic key and another cryptographic key, on the basis of the supplied correction parameters and the unique code, and decrypt the encrypted value read out from the non-volatile memory using the calculated first cryptographic key.

16. The system according to claim 9,
wherein the cryptographic key used for encryption of the value stored in the non-volatile memory is defined as the first cryptographic key and the correction parameter is defined as the first correction parameter,
wherein the system comprises the management integrated circuit including the database and the authentication unit,
wherein the management integrated circuit holds, in the database, the first correction parameter and the second correction parameter associated with the semiconductor integrated circuit and holds, in the authentication unit, the challenge data and the a challenge data expected value obtained by encrypting the challenge data by using the second cryptographic key corresponding to the second correction parameter, and supplies the challenge data to the semiconductor integrated circuit, wherein the semiconductor integrated circuit holds the second correction parameter,
wherein the cryptographic processor generates the second cryptographic key on the basis of the second correction parameter and the unique code, encrypts the supplied challenge data by using the second cryptographic key, and returns the challenge data to the management integrated circuit,
wherein the management integrated circuit compares the encrypted and returned challenge data with the challenge data expected value held in the authentication unit, and in the case of a match, supplies the first correction parameter to the semiconductor integrated circuit, and
wherein the semiconductor integrated circuit calculates the first cryptographic key, on the basis of the supplied first correction parameter and the unique code, and decrypts the encrypted value read out from the non-volatile memory by using the calculated first cryptographic key.

17. The system according to claim 9,
wherein the cryptographic key used for encryption of the value stored in the non-volatile memory is defined as the first cryptographic key and the correction parameter is defined as the first correction parameter,
wherein the system comprises the management integrated circuit including the database and the authentication unit,
wherein the management integrated circuit holds, in the database, the first correction parameter, the second correction parameter, the challenge data, and a public key associated with the semiconductor integrated circuit, and supplies the second correction parameter and the challenge data to the semiconductor integrated circuit,
wherein, in the semiconductor integrated circuit, the cryptographic processor generates the second cryptographic key on the basis of the second correction parameter and the unique code, encrypts the supplied challenge data by using the second cryptographic key, and returns the challenge data to the management integrated circuit,
wherein the management integrated circuit decrypts the encrypted and returned challenge data using the public key, compares the decrypted value with the challenge data, and in the case of a match, supplies the first correction parameter to the management integrated circuit, and
wherein the semiconductor integrated circuit calculates the first cryptographic key, on the basis of the supplied first correction parameter and the unique code, and decrypts the encrypted value read out from the non-volatile memory by using the calculated first cryptographic key.

18. The system according to claim 17,
wherein the second cryptographic key is a secret key of the semiconductor integrated circuit corresponding to the public key.

* * * * *